United States Patent
Oba et al.

(10) Patent No.: US 7,050,945 B2
(45) Date of Patent: May 23, 2006

(54) INFORMATION PROVIDING SYSTEM, INFORMATION PROVIDING METHOD, INFORMATION PROCESSING APPARATUS, INFORMATION PROCESSING METHOD, COMMUNICATION TERMINAL, AND A METHOD FOR COMMUNICATION TERMINAL

(75) Inventors: Haruo Oba, Kanagawa (JP); Taku Sugawara, Tokyo (JP); Takeo Inagaki, Tokyo (JP); Junichi Rekimoto, Tokyo (JP); Nobuyuki Matsushita, Kanagawa (JP); Yuji Ayatsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 179 days.

(21) Appl. No.: 10/416,555

(22) PCT Filed: Sep. 12, 2002

(86) PCT No.: PCT/JP02/09326

§ 371 (c)(1),
(2), (4) Date: Nov. 6, 2003

(87) PCT Pub. No.: WO03/026214

PCT Pub. Date: Mar. 27, 2003

(65) Prior Publication Data

US 2004/0078169 A1    Apr. 22, 2004

(30) Foreign Application Priority Data

Sep. 13, 2001 (JP) ............................. 2001-278496

(51) Int. Cl.
G06F 11/00    (2006.01)

(52) U.S. Cl. ............................... 702/188; 709/223

(58) Field of Classification Search ................ 702/188, 702/182–185; 700/1, 9, 12, 108, 110; 714/25; 709/201, 223
See application file for complete search history.

(56) References Cited

U.S. PATENT DOCUMENTS 6,473,794 B1 * 10/2002 Guheen et al. ............ 709/223

FOREIGN PATENT DOCUMENTS

| JP | 2001-144781 | 5/2001 |
|---|---|---|
| JP | 2001-156704 | 6/2001 |
| JP | 2002-149948 | 5/2002 |
| JP | 2002-150142 | 5/2002 |
| JP | 2002-204239 | 7/2002 |
| JP | 2002-215049 | 7/2002 |
| WO | WO 01/94967 | 12/2001 |

* cited by examiner

Primary Examiner—Edward Raymond
(74) Attorney, Agent, or Firm—Finnegan, Henderson, Farabow, Garrett & Dunner, L.L.P.

(57) ABSTRACT

The present invention relates to an information providing system, an information providing method, an information processing apparatus, an information processing method, and a communication terminal, for providing requested information in an easy manner. In an information board 1, guides about information which can be provided are displayed on display units 2A to 2D. A PDA 11 includes a non-contact IC card, and a reader/writer is disposed in each of information requesting units 3A to 3D. The information board 1 acquires information to be provided to the PDA 11, depending on which one of readers/writers the PDA 11 is brought close to, and establishes Bluetooth communication with the PDA 11 in accordance with a Bluetooth address, acquired from the non-contact IC card, of the PDA 11. After establishing the Bluetooth communication, the information board 1 provides the acquired information to the PDA 11 by means of the Bluetooth communication. The present invention may be applied to various types of information processing apparatuses for providing information to users.

24 Claims, 23 Drawing Sheets

| SPECIFICATION ITEMS | | | |
|---|---|---|---|
| COMMUNICATION SPEED | | | 211.875kbps |
| POWER TRANSMISSION | | CENTER FREQUENCY | 13.56MHz |
| | | OUTPUT POWER | 350mW |
| DATA TRANSMISSION | R/W → CARD | CENTER FREQUENCY | 13.56MHz |
| | | MODULATION METHOD | ASK |
| | CARD → R/W | CENTER FREQUENCY | 13.56MHz |
| | | MODULATION METHOD | LOAD SWITCHING |

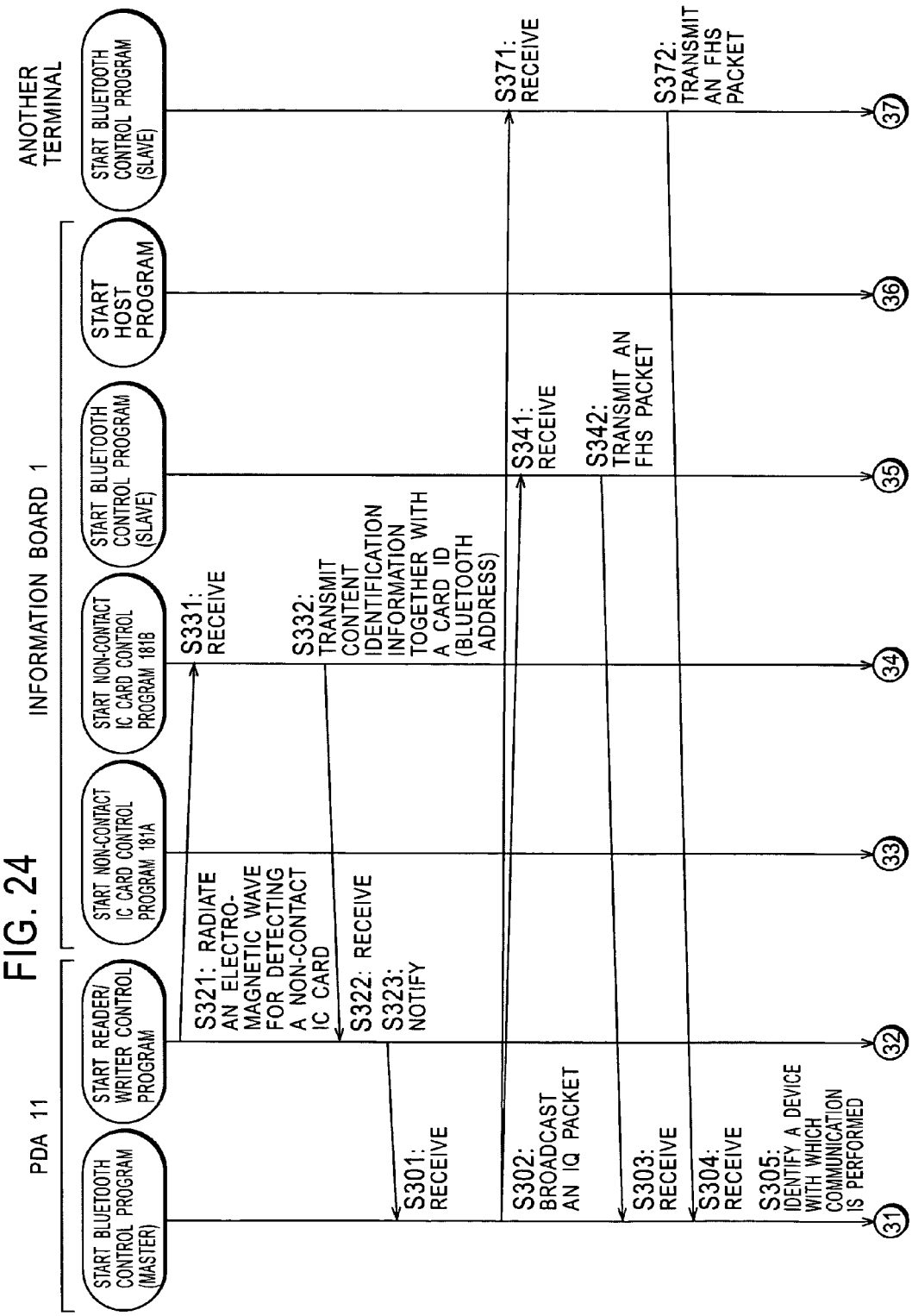

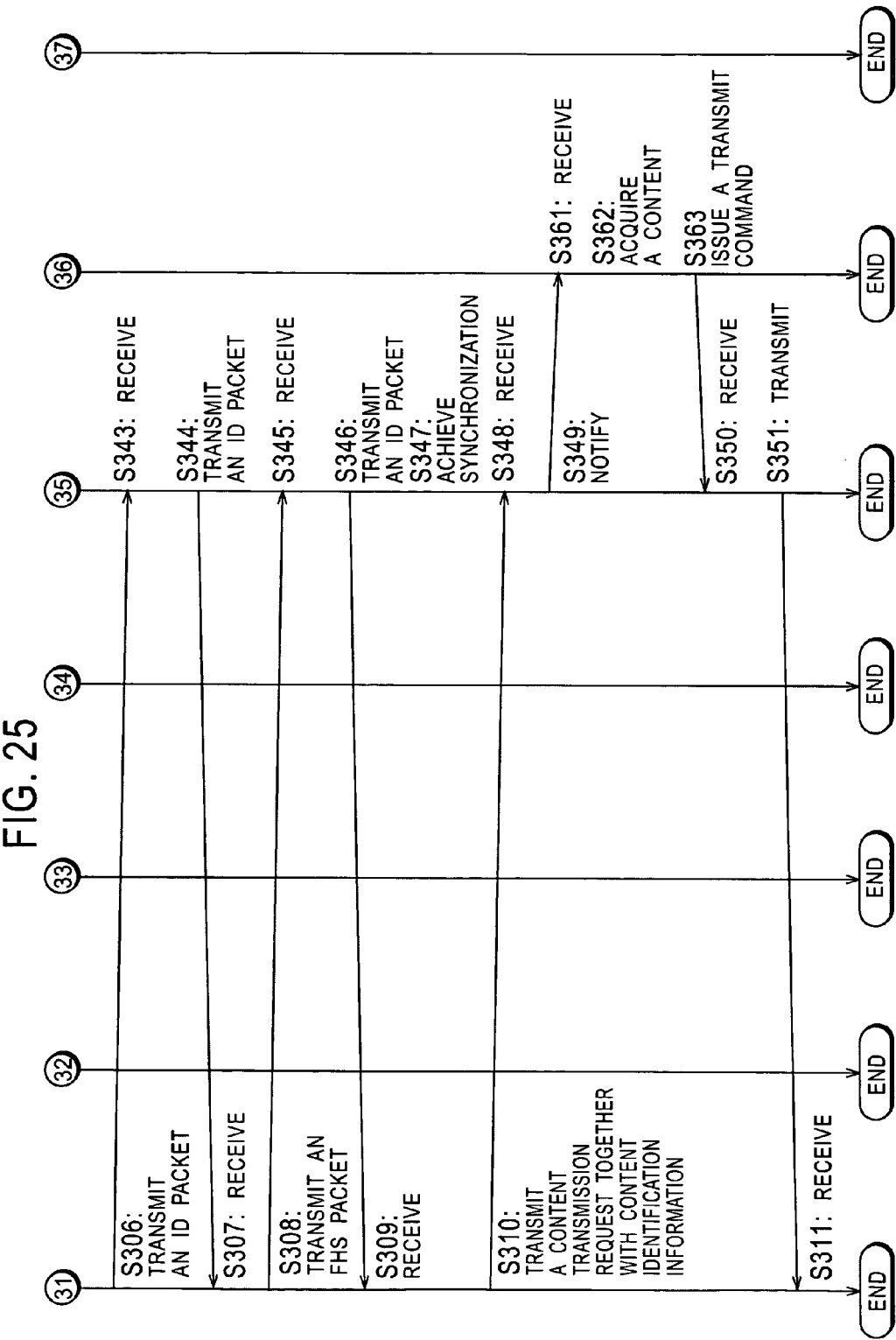

INFORMATION PROVIDING SYSTEM, INFORMATION PROVIDING METHOD, INFORMATION PROCESSING APPARATUS, INFORMATION PROCESSING METHOD, COMMUNICATION TERMINAL, AND A METHOD FOR COMMUNICATION TERMINAL

TECHNICAL FIELD

The present invention relates to an information providing system, an information providing method, an information processing apparatus, an information processing method, a communication terminal, and a method for a communication terminal, which allow information specified by a user to be easily provided to the user.

BACKGROUND ART

Various kinds of guide information are displayed at a huge number of locations in many towns.

For example, a guide information board is installed on each floor of a department store, and a guide about shops, restaurants, or the like located on that floor is displayed thereon. Guide boards are also installed on sidewalks and maps of neighborhoods or the like are displayed thereon.

However, guide information is generally written or drawn directly on boards, and thus the amount of information displayed thereon is limited.

For example, in the case in which information about all shops in a department store is displayed on a single board, only very simple information such as shop names is allowed to be displayed. When one, who visits there for the first time, views such simple guide information, he/she cannot understand what shops are located on which floors.

In the case of a guide board on which information about a plurality of restaurants is displayed, although pictures of two or three dishes available in each restaurant may be displayed, detailed information is not provided, and thus users cannot get detailed information unless they actually visit restaurants and view menus.

Also in the case of guide boards on which maps are displayed, when one views it to get the location of a shop he/she is going to visit, he/she cannot know its detailed location in a building, although he/she can know the name of that building. Thus, he/she has to look for the shop after visiting the building.

As described above, conventional information boards have a difficulty in providing detailed information due to the limitation on the amount of information displayed on boards.

DISCLOSURE OF INVENTION

In view of the above, an object of the present invention is to provide a technique of easily providing various kinds of information to users who need it.

The present invention provides a first information providing system including an information processing apparatus and a communication terminal. In this first information providing system, the information processing apparatus comprises a plurality of display units for displaying guides about information to be provided; and first wireless communication units located close to the respective display units, for communicating with a communication terminal brought close to one of the first wireless communication units, wherein the information processing apparatus further comprises first acquisition means for acquiring identification information of the communication terminal brought close to one of the first wireless communication units, by means of first communication performed by the one of the first wireless communication units; first synchronization achieving means for, on the basis of the identification information acquired by the first acquisition means, achieving synchronization for second communication, using a second wireless communication unit different from the first wireless communication units, with the communication terminal; identification means for identifying the one of the first wireless communication units, close to which the communication terminal has been brought; information acquisition means for, depending on the first wireless communication unit identified by the identification means, acquiring information to be provided to the communication terminal; and first providing means for providing, by means of the second communication, the information acquired by the information acquisition means to the communication terminal with which synchronization has been achieved by the first synchronization achieving means. The communication terminal comprises second providing means for, in response to a request issued by the information processing apparatus, providing the identification information of the communication terminal by means of the first communication performed by a third wireless communication unit operating using electric power generated by means of induction associated with reception of an electromagnetic wave; second synchronization achieving means for achieving synchronization for the second communication, using a fourth wireless communication unit different from the third wireless communication unit, with the information processing apparatus; receiving means for receiving the information transmitted from the information processing apparatus, by means of the second communication the synchronization of which has been achieved by the second synchronization achieving means; and outputting means for outputting the information received by the receiving means.

The present invention also provides a first information providing method for an information providing system, including a method for an information processing apparatus and a method for a communication terminal, wherein the method for the information processing apparatus comprises a first acquisition step, of acquiring identification information of a communication terminal brought close to one of first wireless communication units, by means of first communication performed by the one of first wireless communication units; a first synchronization achieving step of, on the basis of the identification information acquired in the first acquisition step, achieving synchronization for second communication, using a second wireless communication unit different from the first wireless communication units, with the communication terminal; an identification step of identifying the one of the first wireless communication units, close to which the communication terminal has been brought; an information acquisition step of, depending on the first wireless communication unit identified in the identification step, acquiring information to be provided to the communication terminal; and a first providing step of providing, by means of the second communication, the information acquired in the information acquisition step to the communication terminal with which synchronization has been achieved in the first synchronization achieving step, and wherein the method for the communication terminal comprises a second providing step of, in response to a request issued by the information processing apparatus, providing the identification information of the communication terminal by means of the first communication performed by a third wireless communication unit operating using electric power generated by means of induction associated with reception of an electromagnetic wave; a second synchronization step of achieving synchronization for the second communication, using a fourth wireless communication unit different from the third wireless communication unit, with the information processing apparatus; a receiving step of receiving the information transmitted from the information processing apparatus, by means of the second communication the synchronization of which has been achieved in the second synchronization achieving step; and an outputting step of outputting the information received in the receiving step.

The present invention also provides a first information processing apparatus comprising first acquisition means for acquiring identification information of a communication terminal brought close to one of first wireless communication units by means of first communication performed by the one of the first wireless communication units with the communication terminal; synchronization achieving means for, on the basis of the identification information acquired by the first acquisition means, achieving synchronization for second communication, using a second wireless communication unit different from the first wireless communication units, with the communication terminal; identification means for identifying the one of the first wireless communication units, close to which the communication terminal has been brought; information acquisition means for, depending on the first wireless communication unit identified by the identification means, acquiring information to be provided to the communication terminal; and providing means for providing, by means of the second communication, the information acquired by the information acquisition means to the communication terminal with which synchronization has been achieved by the synchronization achieving means.

The synchronization achieving means may achieve synchronization by acquiring attribute information of a plurality of terminals, including said communication terminal, present in the vicinity of the information processing apparatus, and achieving synchronization with the communication terminal detected, on the basis of the identification information, as a terminal which has transmitted attribute information corresponding to the identification information.

The providing means may provide the information by a process including acquiring terminal name information from each of the plurality of terminals, including said communication terminal, present in the vicinity of the information processing apparatus the synchronization of which has been achieved by the synchronization achieving means; on the basis of the identification information, identifying the communication terminal which has transmitted terminal name information corresponding to the identification information; and providing the information to the communication terminal.

The first information acquisition means may acquire the information to be provided to the communication terminal from a storage unit disposed in the information processing apparatus or from a storage unit disposed close to the information processing apparatus.

The information acquisition means may acquire the information to be provided to the communication terminal from a particular server via a network.

The information processing apparatus may further comprise changing means for changing a guide displayed on the display unit to another guide, wherein the information acquisition means may acquire the information to be provided to the communication terminal, depending on the guide changed by the changing means.

The present invention also provides a first information processing method for an information processing apparatus, comprising a first acquisition step, of acquiring identification information of a communication terminal brought close to one of first wireless communication units, by means of first communication performed by the one of first wireless communication units; a synchronization achieving step of, on the basis of the identification information acquired in the first acquisition step, achieving synchronization for second communication, using a second wireless communication unit different from the first wireless communication units, with the communication terminal; an identification step of identifying the one of the first wireless communication units, close to which the communication terminal has been brought; an information acquisition step of, depending on the first wireless communication unit identified in the identification step, acquiring information to be provided to the communication terminal; and a providing step of providing, by means of the second communication, the information acquired in the information acquisition step to the communication terminal with which synchronization has been achieved in the synchronization achieving step.

The present invention also provides a first program for a computer to execute a process associated with an information process apparatus, wherein the process comprises a first acquisition step, of acquiring identification information of a communication terminal brought close to one of first wireless communication units, by means of first communication performed by the one of first wireless communication units; a synchronization achieving step of, on the basis of the identification information acquired in the first acquisition step, achieving synchronization for second communication, using a second wireless communication unit different from the first wireless communication units, with the communication terminal; an identification step of identifying the one of the first wireless communication units, close to which the communication terminal has been brought; an information acquisition step of, depending on the first wireless communication unit identified in the identification step, acquiring information to be provided to the communication terminal; and a providing step of providing, by means of the second communication, the information acquired in the information acquisition step to the communication terminal with which synchronization has been achieved in the synchronization achieving step.

The present invention also provides a second information providing system including an information processing apparatus and a communication terminal, wherein the information processing apparatus comprises a plurality of display units for displaying guides about information to be provided; first wireless communication units which are disposed on the respective display units and which operate using electric power generated by means of induction associated with reception of an electromagnetic wave transmitted from a communication terminal brought close; first providing means for providing first identification information assigned to a first wireless communication unit, which is one of the plurality of first wireless communication units and close to which the communication terminal has been brought, and also providing second identification information identifying information to be provided, by means of first communication performed by the first wireless communication unit close to which the communication terminal has been brought; first synchronization achieving means for achieving synchronization for second communication, using a second wireless communication unit different from the first wireless communication units, with the communication terminal; information acquisition means for acquiring information corresponding to the second identification information, in response to receiving the first identification information transmitted from the communication terminal by means of the second communication the synchronization of which has been achieved by the first synchronization achieving means; and second providing means for providing the information acquired by the information acquisition means to the communication terminal by using the second communication, and wherein the communication terminal comprises a third wireless communication unit for communicating, via an electromagnetic wave, with a first wireless communication unit, which is one of the plurality of first wireless communication units disposed in the information processing apparatus and close to which the communication terminal has been brought; acquisition means for acquiring, by means of the first communication performed by the third wireless communication unit, the first identification information assigned to the first wireless communication unit, close to which the communication terminal has been brought, and also acquiring the second identification information identifying the information to be provided by the information processing apparatus; second synchronization achieving means for, on the basis of the first identification information acquired by the acquisition means, achieving synchronization for the second communication, using a fourth wireless communication unit different from the third wireless communication unit, with the information processing apparatus; requesting means for requesting the information processing apparatus to provide information corresponding to the second identification information, by transmitting the second identification information acquired by the acquisition means to the information processing apparatus by means of the second communication the synchronization of which has been achieved by the second synchronization means; and receiving means for receiving the information transmitted, in response to the request issued by the requesting means, from the information processing apparatus, by means of the second communication.

The present invention also provides a second information providing method for an information providing system, including a method for an information processing apparatus and a method for a communication terminal, wherein the method for the information processing apparatus comprises a first providing step of providing first identification information assigned to a first wireless communication unit, which is one of the plurality of first wireless communication units and close to which the communication terminal has been brought, and also providing second identification information identifying information to be provided, by means of first communication performed by the first wireless communication unit close to which the communication terminal has been brought; a first synchronization achieving step, of achieving synchronization for second communication, using a second wireless communication unit different from the first wireless communication units, with the communication terminal; an information acquisition step of acquiring information corresponding to the second identification information, in response to receiving the second identification information transmitted, by means of the second communication the synchronization of which has been achieved in the first synchronization achieving step, from the communication terminal; and a second providing step of providing the information acquired in the information acquisition step to the communication terminal by using the second communication, and wherein the method for the communication terminal comprises an acquisition step of acquiring, by means of the first communication performed by the third wireless communication unit, the first identification information assigned to the first wireless communication unit, close to which the communication terminal has been brought, and also acquiring the second identification information identifying the information to be provided by the information processing apparatus; a second synchronization achieving step of, on the basis of the first identification information acquired in the acquisition step, achieving synchronization for the second communication, using a fourth wireless communication unit different from the third wireless communication unit, with the information processing apparatus; a request issuing step of requesting the information processing apparatus to provide information corresponding to the second identification information, by transmitting the second identification information acquired in the acquisition step to the information processing apparatus by means of the second communication the synchronization of which has been achieved in the second synchronization step; and a receiving step of receiving the information transmitted, in response to the request issued in the request issuing step, from the information processing apparatus, by means of the second communication.

The present invention also provides a second information processing apparatus comprising first providing means for providing first identification information assigned to a first wireless communication unit, which is one of the plurality of first wireless communication units and close to which the communication terminal has been brought, and also providing second identification information identifying information to be provided, by means of first communication performed by the first wireless communication unit close to which the communication terminal has been brought; synchronization achieving means for achieving synchronization for second communication, using a second wireless communication unit different from the first wireless communication units, with the communication terminal; information acquisition means for acquiring information corresponding to the second identification information, in response to receiving the second identification information transmitted from the communication terminal by means of the second communication the synchronization of which has been achieved by the synchronization achieving means; and second providing means for providing the information acquired by the information acquisition means to the communication terminal by using the second communication.

The information acquisition means may acquire the information to be provided to the communication terminal from a storage unit disposed in the information processing apparatus.

The information acquisition means may acquire the information to be provided to the communication terminal from a particular server via a network.

The second information processing apparatus may further comprise changing means for changing a guide displayed on the display unit to another guide, wherein the information acquisition means may acquire the information to be provided to the communication terminal, depending on the guide changed by the changing means.

The present invention also provides a second information processing method for an information processing apparatus, comprising a first providing step of providing first identification information assigned to a first wireless communication unit, which is one of the plurality of first wireless communication units and close to which the communication terminal has been brought, and also providing second identification information identifying information to be provided, by means of first communication performed by the first wireless communication unit close to which the communication terminal has been brought; a synchronization achieving step of achieving synchronization for second communication, using a second wireless communication unit different from the first wireless communication units, with the communication terminal; an information acquisition step of acquiring information corresponding to the second identification information, in response to receiving the second identification information transmitted, by means of the second communication the synchronization of which has been achieved in the synchronization achieving means, from the communication terminal; and a second providing step of providing the information acquired in the information acquisition step to the communication terminal by using the second communication.

The present invention also provides a second program for a computer to execute a process associated with an information process apparatus, wherein the process comprises a first providing step of providing first identification information assigned to a first wireless communication unit, which is one of the plurality of first wireless communication units and close to which the communication terminal has been brought, and also providing second identification information identifying information to be provided, by means of first communication performed by the first wireless communication unit close to which the communication terminal has been brought; a synchronization achieving step of achieving synchronization for second communication, using a second wireless communication unit different from the first wireless communication units, with the communication terminal; an information acquisition step of acquiring information corresponding to the second identification information, in response to receiving the second identification information transmitted, by means of the second communication the synchronization of which has been achieved in the synchronization achieving means, from the communication terminal; and a second providing step of providing the information acquired in the information acquisition step to the communication terminal by using the second communication.

The present invention also provides a communication terminal comprising acquisition means for acquiring, by means of first communication performed by the first wireless communication unit, first identification information assigned to the wireless communication unit, close to which the communication terminal has been brought, and also acquiring second identification information identifying information to be provided by the information processing apparatus; synchronization achieving means for, on the basis of the first identification information acquired by the acquisition means, achieving synchronization for second communication, using a second wireless communication unit different from the first wireless communication unit, with the information processing apparatus; requesting means for requesting the information processing apparatus to provide information corresponding to the second identification information, by transmitting the second identification information acquired by the acquisition means to the information processing apparatus by means of the second communication the synchronization of which has been achieved by the synchronization means; and receiving means for receiving the information transmitted, in response to the request issued by the requesting means, from the information processing apparatus, by means of the second communication.

The synchronization achieving means may achieve synchronization by acquiring attribute information of a plurality of terminals, including the information processing terminal, present in the vicinity of the communication terminal, and achieving synchronization with the information processing apparatus detected, on the basis of the first identification information, as a terminal which has transmitted attribute information corresponding to the first identification information.

The requesting means may request the information processing apparatus to provide the information by a process including acquiring terminal name information from each of the plurality of terminals, including the information processing apparatus, which are present in the vicinity of the communication terminal and the synchronization of which has been achieved by the synchronization achieving means; on the basis of the first identification information, identifying the information processing apparatus which has transmitted terminal name information corresponding to the first identification information; and requesting the information processing apparatus to provide said information.

The present invention also provides a communication method for a communication terminal, comprising an acquisition step of acquiring, by means of first communication performed by the first wireless communication unit, first identification information assigned to the wireless communication unit, close to which the communication terminal has been brought, and also acquiring second identification information identifying information to be provided by the information processing apparatus; a synchronization achieving step of, on the basis of the first identification information acquired in the acquisition step, achieving synchronization for second communication, using a second wireless communication unit different from the first wireless communication unit, with the information processing apparatus; a request issuing step of requesting the information processing apparatus to provide information corresponding to the second identification information, by transmitting the second identification information acquired in the acquisition step to the information processing apparatus by means of the second communication the synchronization of which has been achieved in the synchronization step; and a receiving step of receiving the information transmitted, in response to the request issued in the request issuing step, from the information processing apparatus, by means of the second communication.

The present invention also provides a program for a computer to execute a process associated with a communication terminal, wherein the process comprises an acquisition step of acquiring, by means of first communication performed by the first wireless communication unit, first identification information assigned to the wireless communication unit, close to which the communication terminal has been brought, and also acquiring second identification information identifying information to be provided by the information processing apparatus; a synchronization achieving step of, on the basis of the second identification information acquired in the acquisition step, achieving synchronization for second communication, using a second wireless communication unit different from the first wireless communication unit, with the information processing apparatus; a request issuing step of requesting the information processing apparatus to provide information corresponding to the second identification information, by transmitting the second identification information acquired in the acquisition step to the information processing apparatus by means of the second communication the synchronization of which has been achieved in the synchronization step; and a receiving step of receiving the information transmitted, in response to the request issued in the request issuing step, from the information processing apparatus, by means of the second communication.

The present invention also provides an information processing apparatus comprising an information storage unit for storing a plural pieces of information to be provided, the plural pieces of information corresponding to respective first wireless communication units; identification means for identifying the one of the first wireless communication units, close to which the communication terminal has been brought; information acquisition means for, depending on the first wireless communication unit identified by the identification means, acquiring information to be provided to the communication terminal from the information storage unit; and providing means for providing, by means of the second communication using a second wireless communication unit different from the first wireless communication unit, the information acquired by the information acquisition means to the communication terminal.

In the first information providing system and the first information providing method according to the present invention, identification information of the communication terminal brought close to one of the first wireless communication units is acquired by means of the first communication performed by that one of the first wireless communication units, and synchronization is established for second communication, using the second wireless communication unit different from the first wireless communication units, with the communication terminal. Furthermore, of the plurality of first wireless communication units, the one close to which the communication terminal has been brought is identified, and, depending on the identified first wireless communication unit, information to be provided to the communication terminal is acquired. Thereafter, the acquired information is provided to the communication terminal, with which synchronization has been achieved, by means of the second communication. In response to a request issued by the information processing apparatus, the identification information of the communication terminal is supplied to the information processing apparatus by means of the first communication performed, via an electromagnetic wave, by the third wireless communication unit, and synchronization for the second communication with the information processing apparatus, using the fourth wireless communication unit different from the third wireless communication unit, is established. Furthermore, by using the second communication whose synchronization has been achieved, the communication terminal receives the information transmitted from the information processing apparatus and outputs the received information.

In the first information processing apparatus, the first information processing method, and the first program, according to the present invention, the identification information of the communication terminal brought close to one of the first wireless communication units is acquired by means of the first communication performed by that one of the first wireless communication units, and synchronization is established for second communication, using the second wireless communication unit different from the first wireless communication units, with the communication terminal. Furthermore, of the plurality of first wireless communication units, the one close to which the communication terminal has been brought is identified, and, depending on the identified first wireless communication unit, information to be provided to the communication terminal is acquired. Thereafter, the acquired information is provided to the communication terminal, with which synchronization has been achieved, by means of the second communication.

In the second information providing system and the second information providing method according to the present invention, the first identification information assigned to the first wireless communication unit, which is one of the plurality of first wireless communication units and close to which the communication terminal has been brought, and the second identification information identifying information to be provided are provided to the communication terminal by means of the first communication performed by the first wireless communication unit close to which the communication terminal has been brought; and the synchronization for the second communication with the communication terminal, using the second wireless communication unit different from the first wireless communication units, is established. If the information processing apparatus receives the first identification information transmitted from the communication terminal by means of the second communication whose synchronization has been established, the information processing apparatus acquires the information corresponding to the second identification information and provides the acquired information to the communication terminal by means of the second communication. Furthermore, by means of first communication performed by the third wireless communication unit, the first identification information assigned to the first wireless communication unit, close to which the communication terminal has been brought, and also the second identification information identifying information to be provided by the information processing apparatus are acquired, and synchronization is established for second communication with the information processing apparatus, using the fourth wireless communication unit different from the third wireless communication unit. Furthermore, by using the second communication whose synchronization has been achieved, the acquired second identification information is transmitted to the information processing apparatus, and a request for providing the information corresponding to the second identification information is issued. In response to the request, the information transmitted from the information processing apparatus by means of the second communication is received.

In the second information processing apparatus, the second information processing method, and the second program, according to the present invention, the first identification information assigned to the first wireless communication unit, which is one of the plurality of first wireless communication units and close to which the communication terminal has been brought, and the second identification information identifying information to be provided are provided to the communication terminal by means of the first communication performed by the first wireless communication unit close to which the communication terminal has been brought; and the synchronization for the second communication with the communication terminal, using the second wireless communication unit different from the first wireless communication units, is established. If the information processing apparatus receives the second identification information transmitted from the communication terminal by means of the second communication whose synchronization has been established, the information processing apparatus acquires the information corresponding to the second identification information and provides the acquired information to the communication terminal by means of the second communication.

In the communication terminal, the method for the communication terminal, and the program for the communication terminal, according to the present invention, the first identification information assigned to the wireless communication unit, close to which the communication terminal has been brought, and also the second identification information identifying information to be provided by the information processing apparatus are acquired by means of the first communication using the first wireless communication unit, and synchronization is established for second communication with the information processing apparatus, using the second wireless communication unit different from the first wireless communication unit. Furthermore, by using the second communication whose synchronization has been achieved, the acquired second identification information is transmitted to the information processing apparatus, and a request for providing the information corresponding to the second identification information is issued. In response to the request, the information transmitted from the information processing apparatus by means of the second communication is received.

BRIEF DESCRIPTION OF THE DRAWINGS

FIG. 24 is a flow chart showing still another process performed in the information providing system shown in FIG. 1.

FIG. 25 is a flow chart showing a process, following that shown in FIG. 24, performed in the information providing system shown in FIG. 1.

BEST MODE FOR CARRYING OUT THE INVENTION

Figure 1:
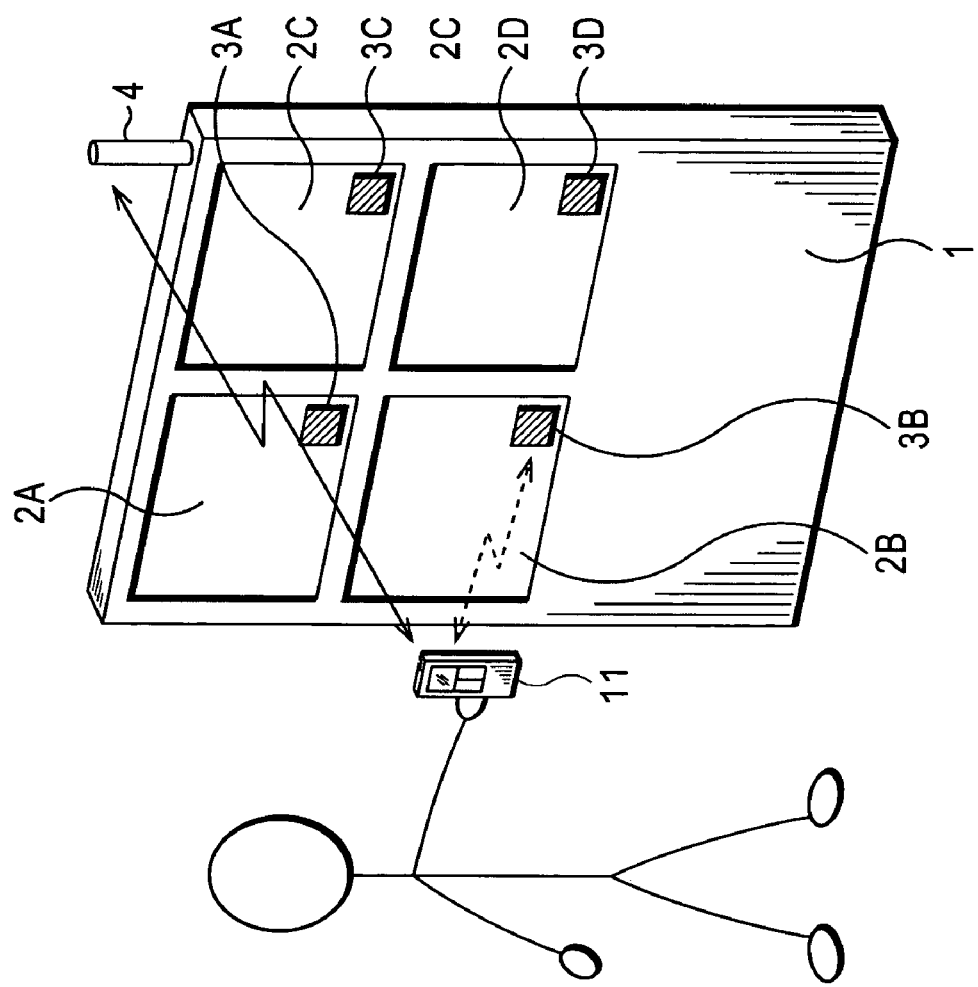
FIG. 1 is a diagram showing an example of an information providing system according to the present invention.

FIG. 1 is a diagram showing an example of an information providing system according to the present invention.

The information board 1 shown in FIG. 1 is installed at a particular location in a town so as to provide to users various kinds of information associated with its neighborhood.

In the example shown in FIG. 1, the information board 1 includes four display units (display units 2A to 2D). When a user views guide information displayed on the display units 2A to 2D, if the user brings his/her own terminal such as a PDA (Personal Digital Assistants) device 11 into a range close to the information requesting unit (one of information requesting units 3A to 3D) of a particular display unit, detailed information is displayed on his/her terminal.

Figure 2:
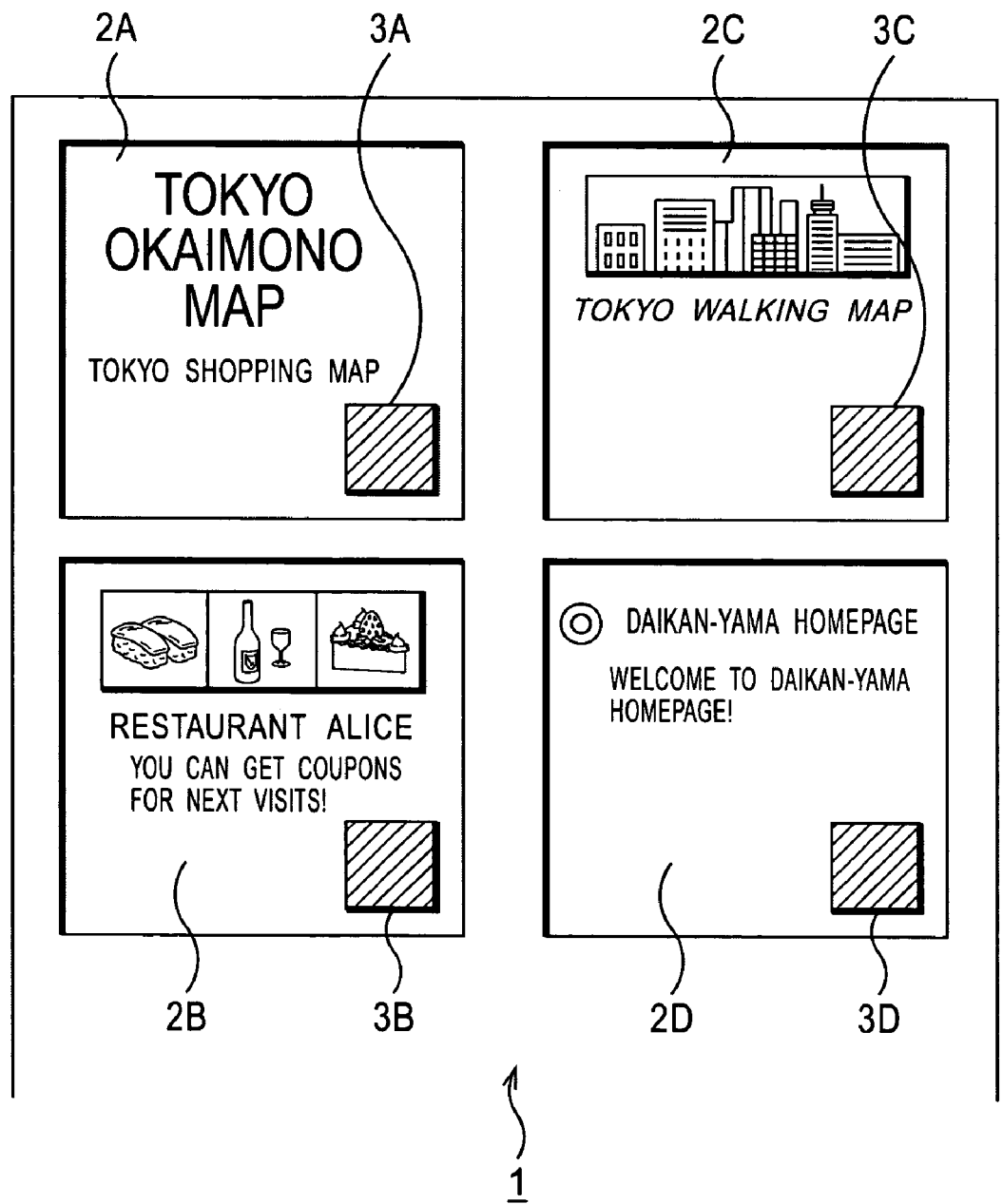
FIG. 2 is a diagram showing an example of information displayed on an information board shown in FIG. 1.

FIG. 2 shows an example of guide information displayed on the display units 2A to 2D of the information board 1 shown in FIG. 1.

In this example shown in FIG. 2, the display unit 2A displays a guide indicating that if a user brings a PDA 11 into a range close to the information requesting unit 3A located in the bottom right corner of the display unit 2A, information about "Tokyo Shopping Map" is provided to the user. Similarly, the display unit 2B displays a guide indicating that if the PDA 11 is brought into a range close to the information requesting unit 3B in the bottom right of the display unit 2B, information about "Restaurant Alice" is provided to a user.

The display unit 2C displays a guide indicating that if the PDA 11 is brought into a range close to the information requesting unit 3C located in the bottom right corner of the display unit 2C, information about "Tokyo Walking Map" is provided to a user. The display unit 2D displays a guide indicating that if the PDA 11 is brought into a range close to the information requesting unit 3D located in the bottom right corner of the display unit 2D, information about "Daikan-yama" is provided to a user.

Figure 3:
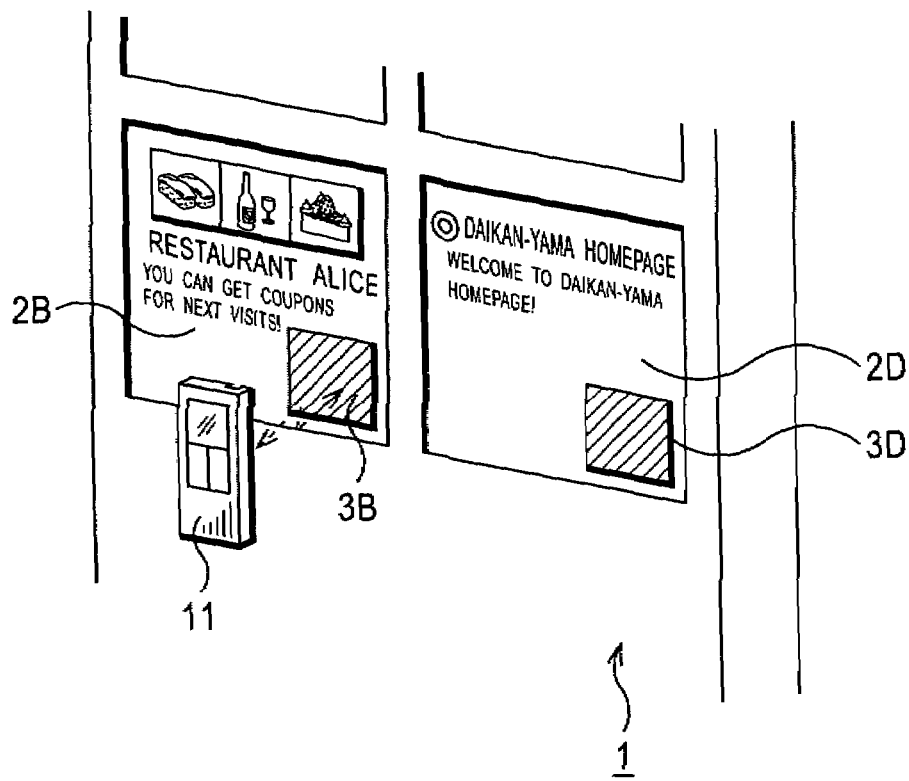
FIG. 3 is a diagram showing communication between a PDA and the information board shown in FIG. 1.

When a user wants to view a menu of dishes available in "Restaurant Alice" or to view an image showing the outward appearance or the like of the restaurant, if the user brings the PDA 11 into a range close to the information requesting unit 3B as shown in FIG. 3, desired information is displayed on the PDA 11.

Figure 4:
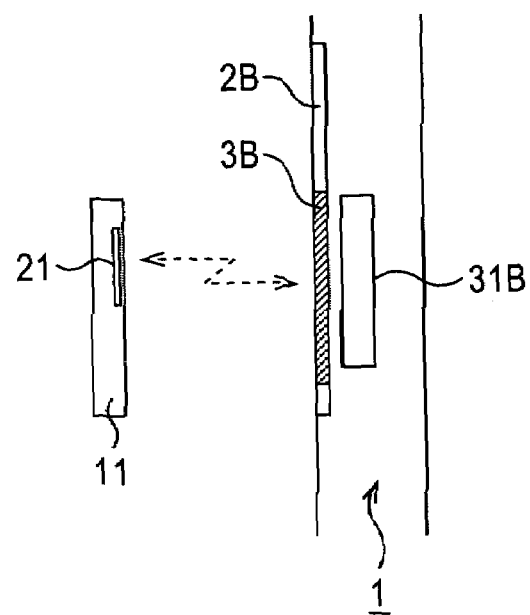
FIG. 4 is another diagram showing communication between a PDA and the information board shown in FIG. 1.

FIG. 4 is a side view of the PDA 11 brought close to the information requesting unit 3B of the information board 1. As shown in FIG. 4, the PDA 11 includes a non-contact IC card 21 for performing short-distance communication, via an electromagnetic wave, with a reader/writer 31B disposed in the information requesting unit 3B.

If the user brings the PDA 11 close to the information requesting unit 3B, the PDA 11 receives an electromagnetic wave radiated from the reader/writer 31B. In response, the non-contact IC card 21 reads the preset identification information of the PDA 11 and supplies it to the reader/writer 31B (information board 1) by means of communication using an electromagnetic wave.

The PDA 11 includes a wireless communication module 181 (FIG. 11) based on, for example, the Bluetooth technique for communicating with the information board 1. The information board 1 also includes a Bluetooth module 45 (FIG. 5), and thus the PDA 11 can communicate with the information board 1 by means of not only the non-contact IC card 21 but also the Bluetooth module 181.

If the information board 1 receives identification information from the non-contact IC card 21 of the PDA 11, the information board 1 establishes synchronization in accordance with the identification information so that Bluetooth communication with the PDA 11 becomes possible. After synchronization with the PDA 11 has been established, the information board 1 reads information about "Restaurant Alice" requested by the user from, for example, a storage unit disposed in the information board 1, and the information board 1 transmits it to the PDA 11 from the antenna 4 shown in FIG. 1.

The information transmitted from the information board 1 is displayed on the display unit of the PDA 11 and thus the user can view a menu, a picture, or the like, of the "Restaurant Alice".

In FIG. 1, a broken-line arrow represents communication performed by means of an electromagnetic wave between the information board 1 and the PDA 11, and a solid-line arrow represents communication performed by means of the Bluetooth technique between the information board 1 and the PDA 11.

Because the information board 1 supplies information after identifying the terminal on the basis of the identification information received via the electromagnetic wave, it is possible to prevent information from being transmitted to a wrong terminal which includes, as with the PDA 11, a Bluetooth module and which is present near the information board 1.

As will be described in detail later, the identification information supplied from the non-contact IC card 21 to the information board 1 includes, for example, a Bluetooth address needed to achieve synchronization between the information board 1 and the PDA 11.

Figure 5:
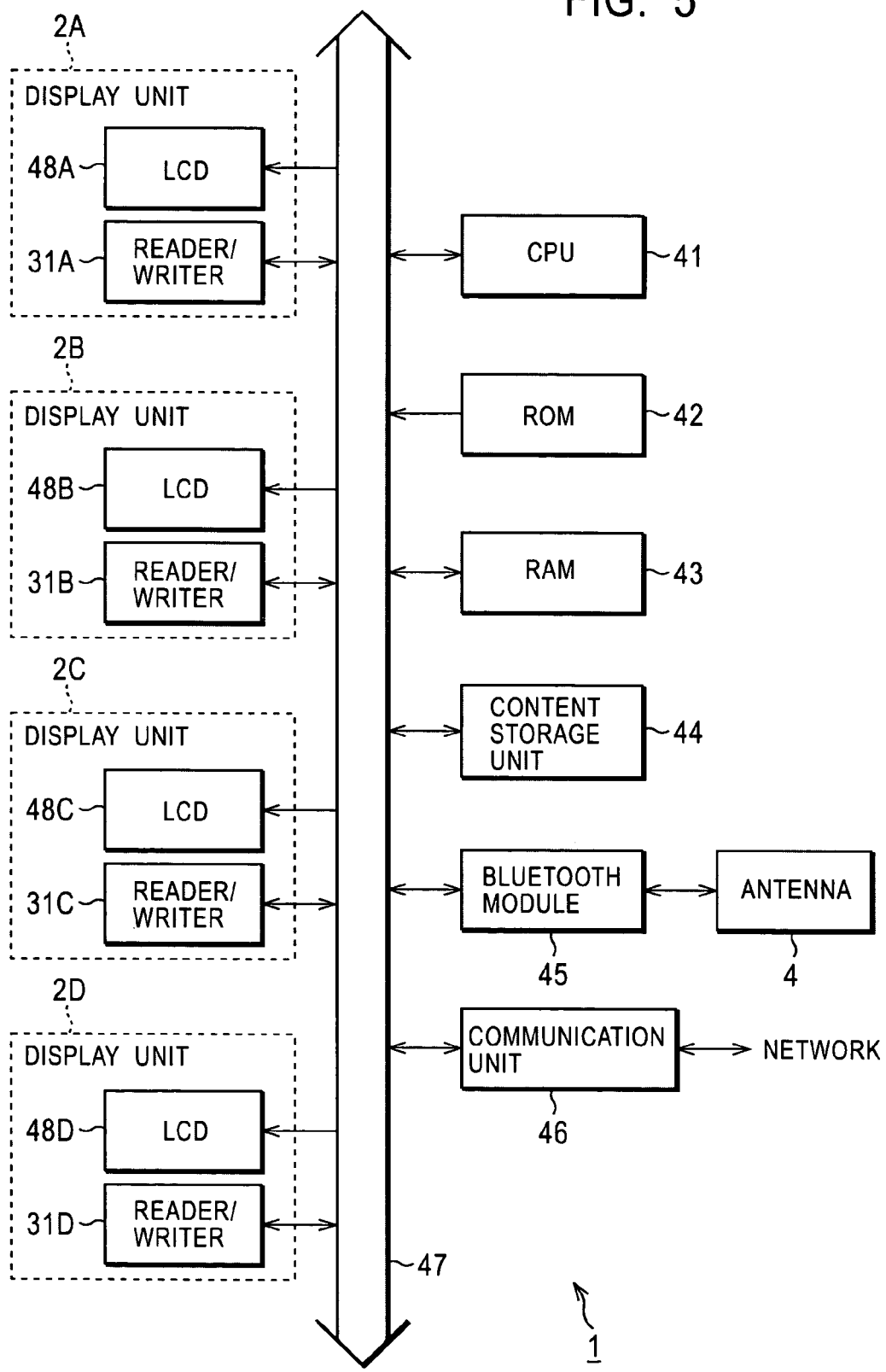
FIG. 5 is a block diagram showing an example of an internal structure of the information board shown in FIG. 1.

As with the reader/writer 31B, the information requesting unit 3A includes, in the inside thereof, a reader/writer 31A, and the information requesting unit 3C includes, in the inside thereof, a reader/writer 31C, the information requesting unit 3D includes, in the inside thereof, a reader/writer 31D (wherein all those parts are shown in FIG. 5).

FIG. 5 is a block diagram showing an example of an internal structure of the information board 1.

A CPU (Central Processing Unit) 41 loads a control program from a ROM (Read Only Memory) 42 into a RAM (Random Access Memory) 43 and controls the operation of the information board 1. The RAM 43 also stores data used by the CPU 41 in various processes.

The CPU 41, the ROM 42, and the RAM 43 are connected to each other via a bus 47, to which various processing units are also connected.

A content storage unit 44 stores various kinds of information (contents) to be provided to users. Under the control of the CPU 41, a content is read from the content storage unit 44 and supplied to a Bluetooth module 45. In the content storage unit 44, contents are stored in connection with the identification information of the readers/writers 31A to 31D disposed in the respective display units 2A to 2D. Therefore, when the CPU 41 is notified by one of readers/writers that a PDA 11 has come close, the CPU 41 can read a correct content in accordance with identification information of the reader/writer.

The content stored in the content storage unit 44 can be rewritten by a manager of the information board 1 to update the information provided to users.

The Bluetooth module 45 communicates, via an antenna 4, with a terminal which includes a Bluetooth module and which is present in the vicinity of the information board 1.

Communication by means of Bluetooth is described below.

One form of a network using Bluetooth is a piconet and another form is a scatternet in which a plurality of piconets are connected to each other wherein each piconet includes Bluetooth devices serving as master and slave devices.

In order to achieve synchronization in a piconet to transmit/receive various kinds of information, it is required that synchronization between master and slave devices in the piconet be established in both the frequency domain and the time domain.

In the Bluetooth technique, a signal is transmitted using a 79-MHz frequency band from, for example, a master device to a slave device. In the transmission of the signal from the master device, the entire 79-MHz frequency band is not occupied at the same time, but the transmission frequency is randomly changed (hopped) in steps of 1 MHz.

In the slave device at the receiving end, the reception frequency is changed in synchronization with the randomly changing transmission frequency so as to receive the information transmitted from the master device.

The pattern of change in frequency employed by the master device and the slave device is referred to as a frequency hopping pattern. The synchronization in the frequency domain is achieved when the same frequency hopping pattern is employed by both the master device and the slave device.

In the Bluetooth system, to allow a master Bluetooth device to communicate with a plurality of slave Bluetooth devices, a communication channel used in communication between them is time-shared in units of 625 μsec. Each 625 μsec time period is referred to as a time slot. When a time slot is shared by master and slave Bluetooth devices, synchronization in the time domain is achieved.

Each slave Bluetooth device calculates a frequency hopping pattern on the basis of the Bluetooth address of the master Bluetooth device and adds an offset to a Bluetooth clock managed by the slave Bluetooth device on the basis of the Bluetooth clock of the master Bluetooth device so as to adjust the timing of time slots.

Each Bluetooth device is assigned a unique 48-bit Bluetooth address, and the Bluetooth clock is managed by each Bluetooth device. More specifically, each Bluetooth address includes a 24-bit LAP (Low Address Part), an 8-bit UAP (Upper Address Part), and a 16-bit NAP (Non-significant Address Part). The frequency hopping pattern is calculated using the whole 24 bits of the LAP and a lower-order 4 bits of the UAP, and thus a total of 28 bits are used in the calculation.

That is, before forming a piconet, "inquiry" and "paging", which will be described later, are performed and various kinds of information including Bluetooth addresses and Bluetooth clocks are transmitted between the master device and slave devices.

In Bluetooth communication, information is transmitted at a rate of about 723.2 kbps. This transmission rate is high enough for the information board 1 to transmit not only text data but also image data or audio data to the PDA 11.

Referring again to FIG. 5, the communication unit 46 includes a modem or a terminal adapter for transmitting/receiving various kinds of information via a network. This makes it possible to acquire a content via a network and supply it to the PDA 11.

The display unit 2A includes an LCD (Liquid Crystal Display) 48A and the reader/writer 31A, and the display unit 2B includes an LCD 48B and the reader/writer 31B. Similarly, the display unit 2C includes an LCD 48C and the reader/writer 31C, and the display unit 2D includes an LCD 48D and the reader/writer 31D. The LCDs 48A to 48D display information under the control of the CPU 41, and the readers/writers 31A to 31D communicate, under the control of the CPU 41, with the non-contact IC card 21 of a PDA 11, brought close, via an electromagnetic wave.

The information displayed on the display units 2A to 2D may be changed at predetermined intervals of time. In the case in which the information displayed on the display units 2A to 2D is changed, the table, which is stored in the content storage unit 44 and which indicates the correspondence between the content and the identification information of the readers/writers 31A to 31D, is also changed so that the contents provided to users are changed at the same intervals of time.

Each of the display units 2A to 2D may be formed of a simple flat board on which information printed on a medium such as paper or a sticker is displayed.

Figure 6:
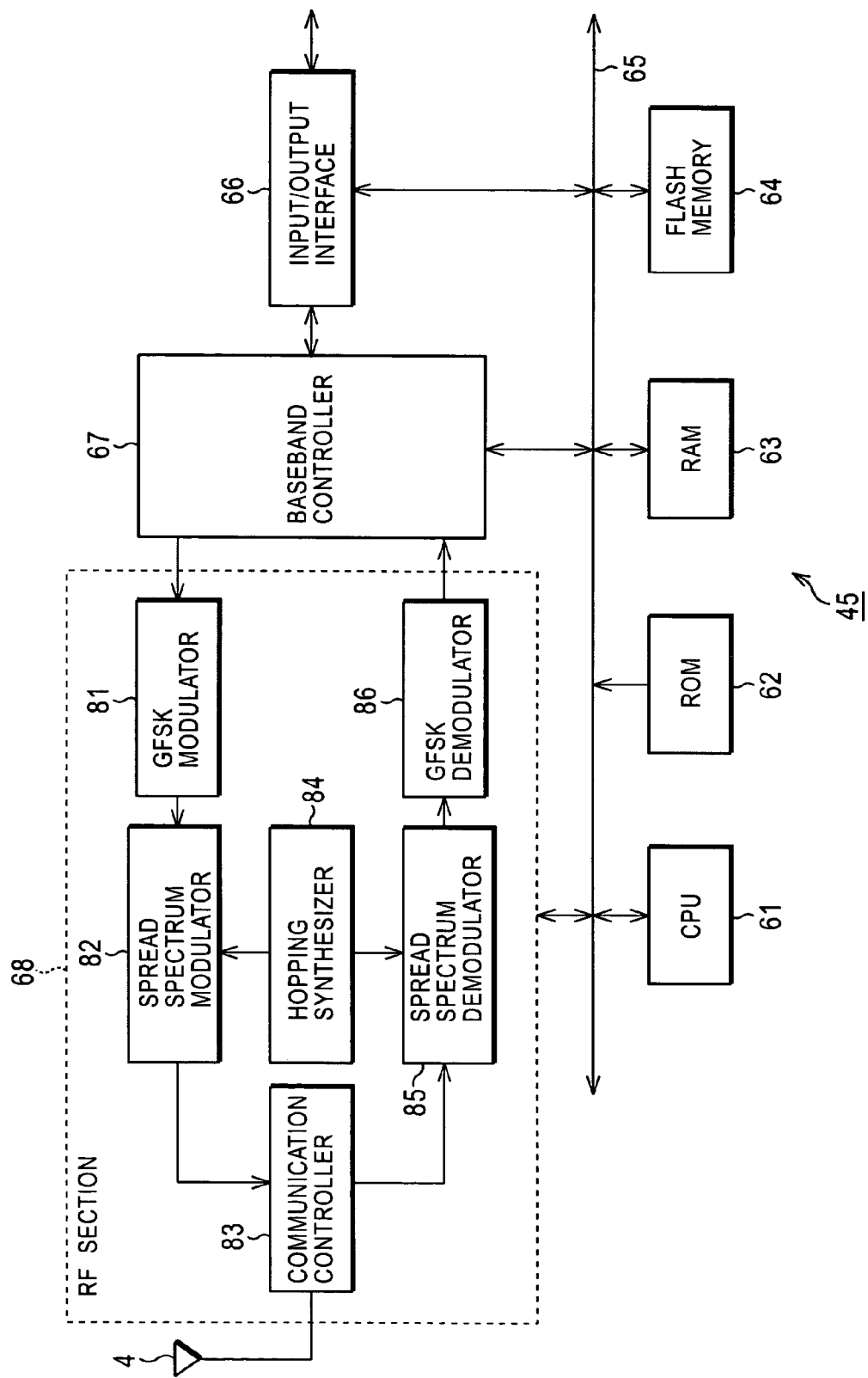
FIG. 6 is a block diagram showing an example of a construction of a Bluetooth module shown in FIG. 5.

FIG. 6 is a block diagram showing an example of a detailed construction of the Bluetooth module 45 shown in FIG. 5.

A CPU 61 loads a control program from a ROM 62 into a RAM 63 and controls the operation of the entire Bluetooth module 45. Component from the CPU 61 through the RAM 63 are connected to each other via a bus 65, to which a flash memory 64 is also connected.

The flash memory 64 stores, for example, Bluetooth device names assigned to the respective Bluetooth devices and capable of being changed in response to requests from users, and also stores Bluetooth addresses uniquely assigned to the respective Bluetooth devices.

The flash memory 64 also stores link keys used, after establishing synchronization in a piconet, to authenticate a Bluetooth device with which to communicate or to encrypt data to be transmitted, and link keys are supplied to the CPU 61 as required.

An input/output interface 66 manages, under the control of the CPU 61, inputting and outputting of data supplied from the CPU 41 shown in FIG. 5 and also data supplied from a baseband controller 67.

More specifically, if the baseband controller 67 receives data from the input/output interface 66 to be transmitted to the PDA 11, the baseband controller 67 transfers the received data to a GFSK (Gaussian Frequency Shift Keying) modulator 81. On the other hand, if the baseband controller 67 received data from a GFSK demodulator 86, the baseband controller 67 transfers the received data over the bus 65 or to the input/output interface 66. The baseband controller 67 also performs various kinds of controls associated with, for example, communication links, packets, logical channels, and security. The baseband controller 67 also performs error correction coding, error correction decoding, and scrambling of data.

The GFSK modulator 81 limits high-frequency components of data supplied from the baseband controller 67 by passing the data through a filter, performs frequency modulation, as primary modulation, on the data, and outputs the resultant frequency-modulated data to a spread spectrum modulator 82.

The spread spectrum modulator 82 changes the carrier frequency in accordance with a frequency hopping pattern supplied from a hopping synthesizer 84 thereby spreading the spectrum of the data supplied to the spread spectrum modulator 82. The resultant signal is output to a communication controller 83.

A spread spectrum demodulator 85 changes the reception frequency in accordance with the frequency hopping pattern supplied from the hopping synthesizer 84 thereby acquiring the signal transmitted from the PDA 11. The spread spectrum demodulator 85 performs spread spectrum demodulation on the acquired signal and outputs the resultant signal to the GFSK demodulator 86. The GFSK demodulator 86 performs GFSK demodulation on the signal supplied from the spread spectrum demodulator 85 and outputs the obtained data to the baseband controller 67.

The communication controller 83 transmits the spectrum-spread signal, using a 2.4-GHz band, from the antennal 4, for example, to the PDA 11. When a signal is received via the antenna 4, the communication controller 83 transfers the received signal to the spread spectrum demodulator 85.

The Bluetooth module 181 disposed in the PDA 11 is constructed in a similar manner to the Bluetooth module 45 shown in FIG. 6, and a CPU in the Bluetooth module 181 is denoted as a CPU 61A in the following description. Similarly, a ROM and a RAM in the Bluetooth module 181 are denoted as a ROM 62A and RAM 63A, respectively. The other parts are also denoted in a similar manner.

Figure 7:
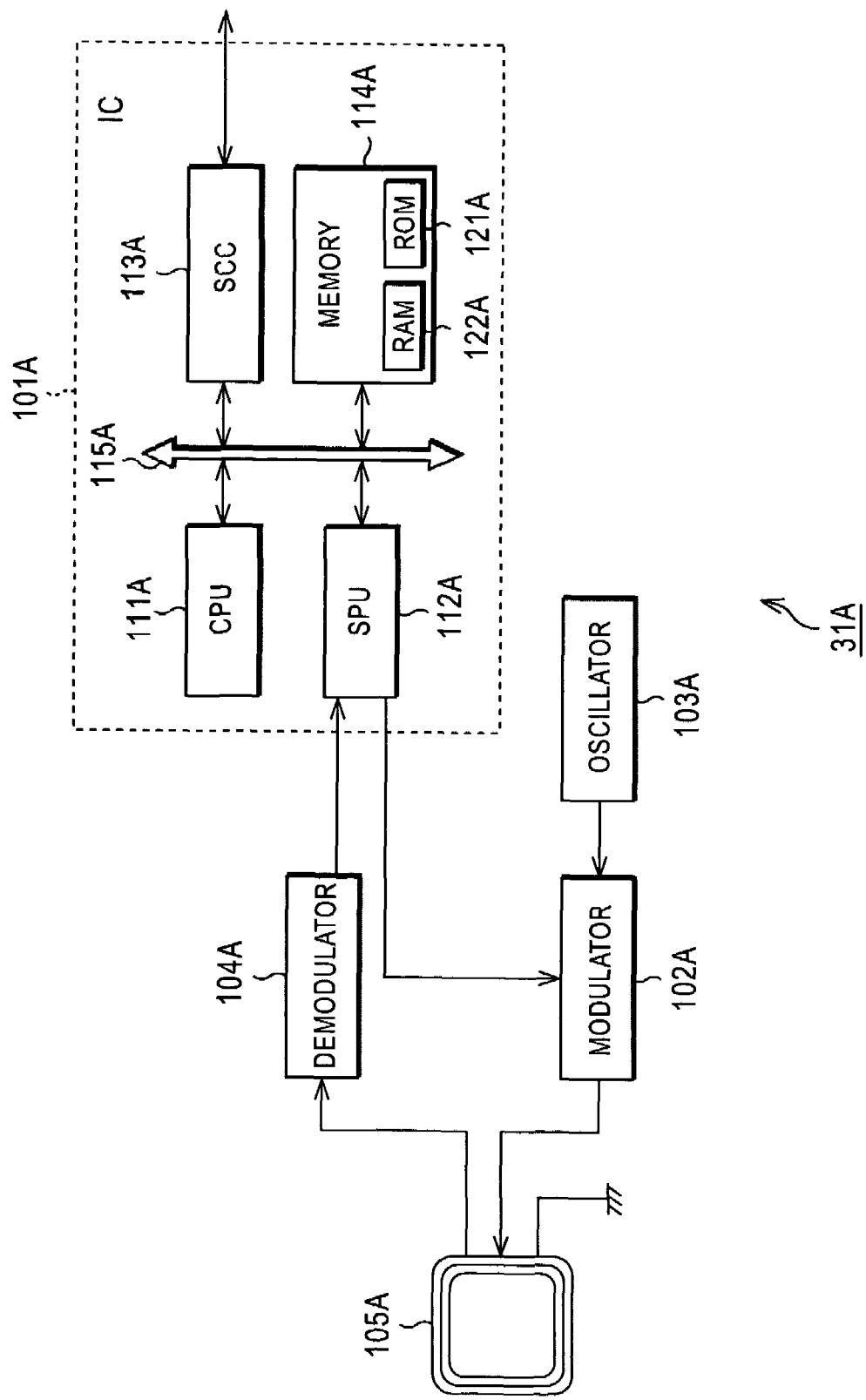
FIG. 7 is a block diagram showing an example of a construction of a Bluetooth module shown in FIG. 5.

FIG. 7 is a block diagram showing an example of a detailed construction of the reader/writer 31A shown in FIG. 5.

An IC 101A includes a CPU 11A, an SPU (Signal Processing Unit) 112A, an SCC (Serial Communication Controller) 113A, and a memory 114A. The memory 114A includes a ROM 121A and a RAM 122A. Those components from the CPU 111A through the memory 114A are connected to each other via a bus 115A.

The CPU 111A loads a control program from the ROM 121A into the RAM 122A and performs various processes in accordance with response data transmitted from the non-contact IC card 21 of the PDA 11 and also in accordance with the control signal supplied from the CPU 41 shown in FIG. 5. For example, the CPU 111A generates a command to be supplied to the non-contact IC card 21 and transmits it to the SPU 112A via the bus 115A. When data transmitted from the non-contact IC card 21 is received, the CPU 111A authenticates the received data.

When a PDA 11 has been brought close and identification information (such as a Bluetooth address) has been received from the PDA 11, the CPU 111A notifies, under the control of the CPU 41, the Bluetooth module 45 that the PDA 11 has been brought close and the identification information has been received from the PDA 11.

If the SPU 112A receives response data, originating from the non-contact IC card 21, from a demodulator 104A, the SPU 112A performs BPSK (Binary Phase Shift Keying) demodulation (Manchester decoding) and supplies the resultant data to the CPU 111A. On the other hand, when the SPU 112A receives a command, to be transmitted to the non-contact IC card 21, via the bus 115A, the SPU 112A performs BPSK modulation (Manchester coding) on the command and outputs the resultant data to the modulator 102A.

If an SCC 113A receives data from the CPU 41, the SCC 114A transfers the received data to the CPU 111A via the bus 115A. On the other hand, when the SCC 113A receives data from the CPU 111A via the bus 115A, the SCC 113A transfers the received data to the CPU 41.

The modulator 102A performs ASK (Amplitude Shift Keying) modulation on a carrier signal with a particular frequency (13.56 MHz, for example), supplied from an oscillator (OSC) 103A, in accordance with data supplied from the SPU 112A and outputs the modulated signal in the form of an electromagnetic wave from the antenna 105A. On the other hand, the demodulator 104A demodulates a modulated (ASK-modulated) signal received via the antennal 105A and outputs the resultant demodulated data to the SPU 112A.

The antenna 105A radiates a predetermined electromagnetic wave. The change in load associated with the electromagnetic wave radiated from the antenna 105A is monitored, and it is determined whether a non-contact IC card 21 (a PDA 11) has been brought close, on the basis of the change in load. If the arrival of a non-contact IC card 21 into the close range is detected, the antenna 105A transmits and receives various kinds of data to and from the non-contact IC card 21.

The readers/writers 31B to 31D are constructed in a similar manner to the reader/writer 31A. In the following description, a CPU of the reader/writer 31B is denoted as a CPU 111B, and an SPU thereof is denoted as an SPU 112B. The other parts are also denoted in a similar manner.

Figure 8:
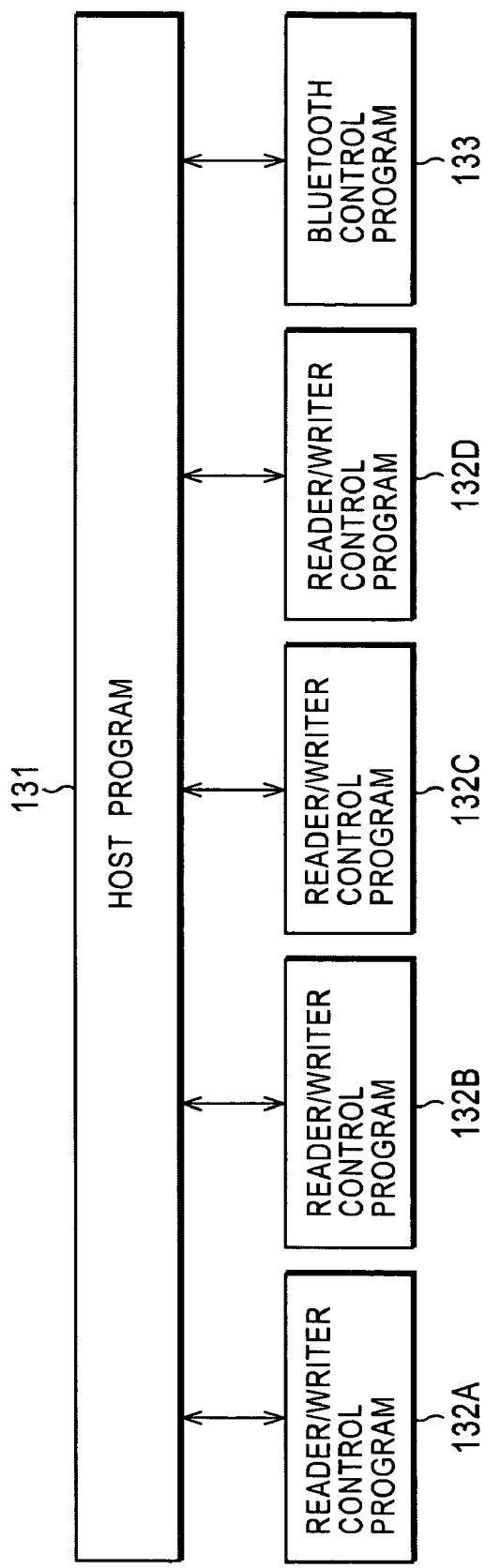
FIG. 8 is a block diagram showing an example of a functional construction of the information board shown in FIG. 1.

FIG. 8 is a block diagram showing an example of a functional construction of the information board 1.

The functional blocks are realized by the CPU 41 by executing a control program stored in the ROM 42.

The host program 131 performs various processes in cooperation with reader/writer control programs 132A to 132D for controlling the respective readers/writers 31A to 31D and a Bluetooth control program 133 for controlling the Bluetooth module 45.

For example, if the host program 131 receives identification information of a PDA 11 from one of the reader/writer control programs 132A to 132D, the host program 131 provides the received identification information to the Bluetooth control program 133 and reads, from the content storage unit 44, a content corresponding to a reader/writer managed by that reader/writer control program.

An example of the construction of the PDA 11 is described below.

Figure 9:
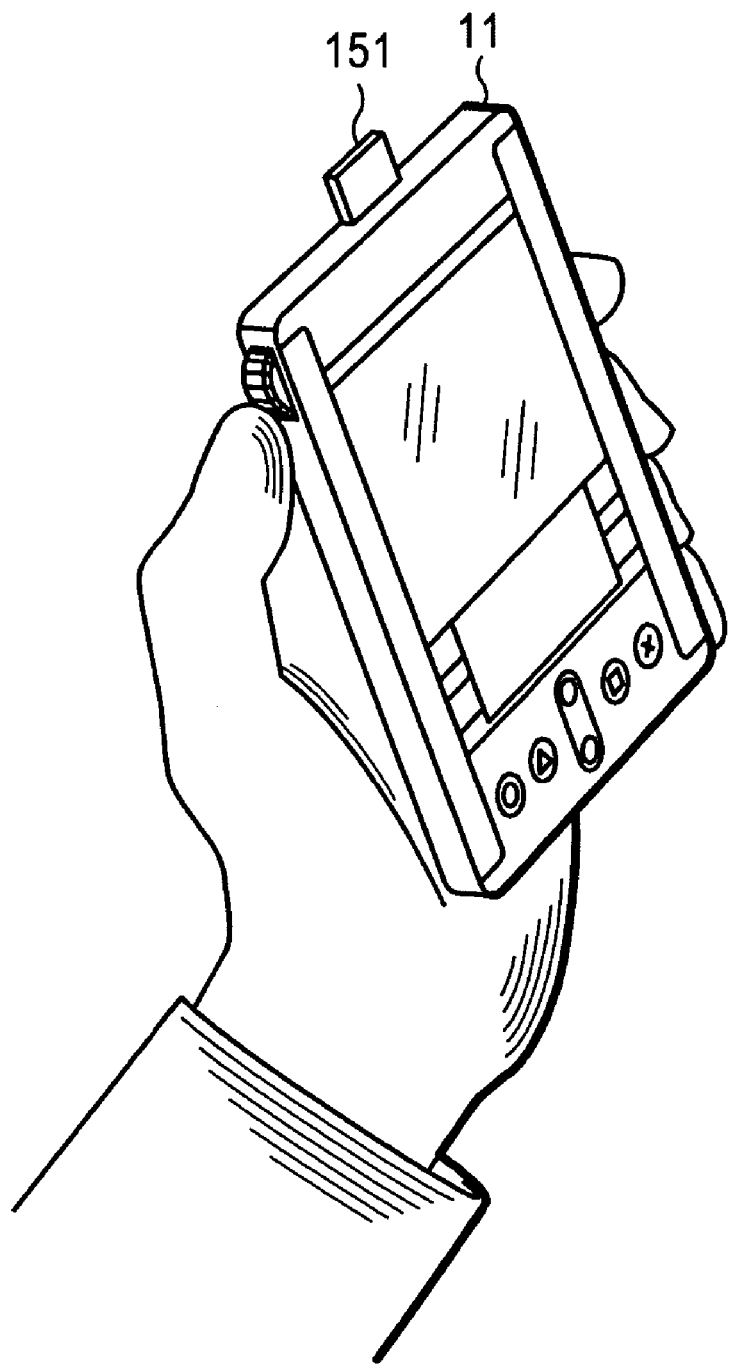
FIG. 9 is a perspective view showing an example of the outward appearance of the PDA shown in FIG. 1.
Figure 10:
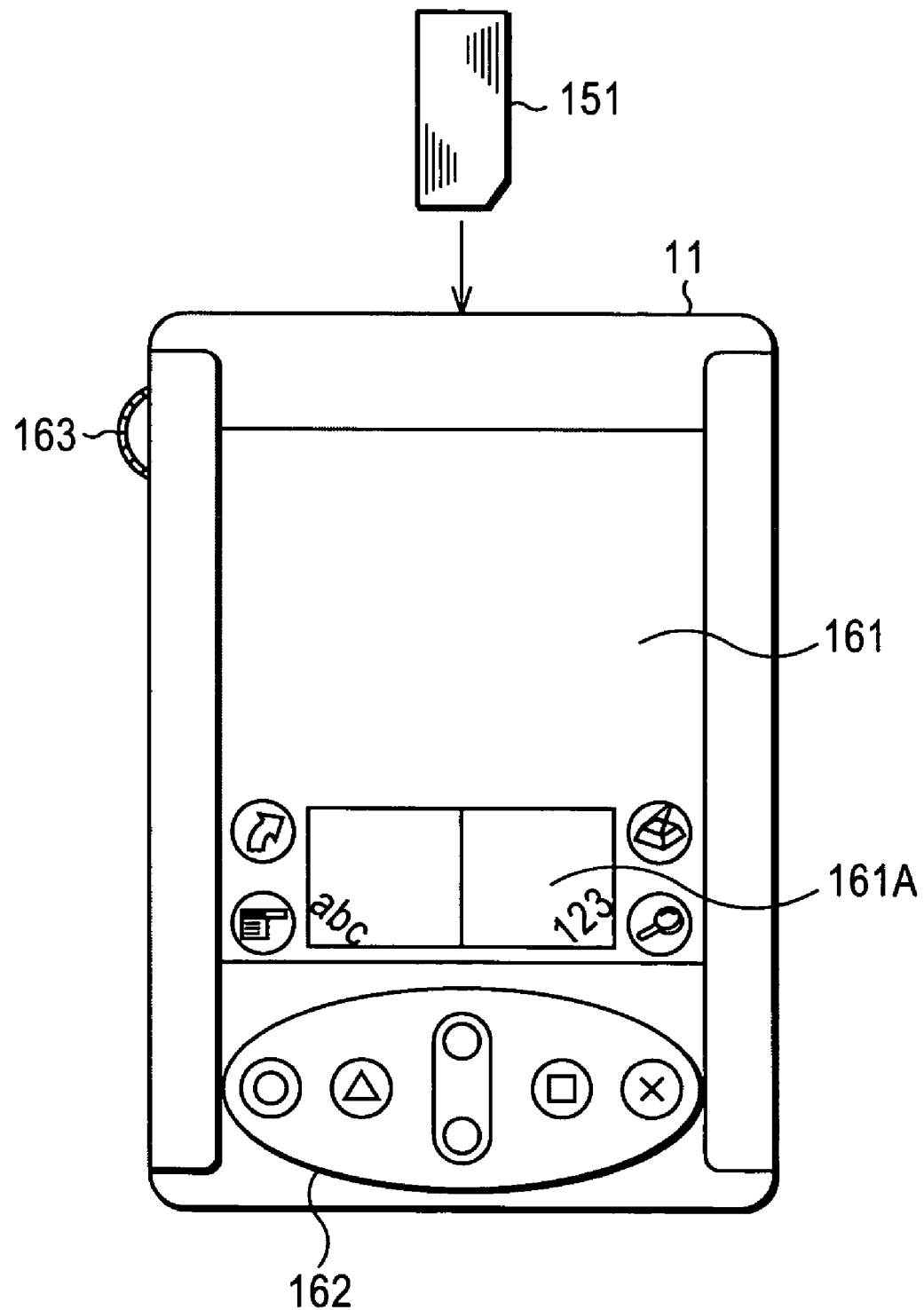
FIG. 10 is a front view showing an example of the outward appearance of the PDA shown in FIG. 1.

FIG. 9 is a perspective view showing the PDA 11 head by a user, and FIG. 10 is a front view of the PDA 11.

The case of the PDA 11 is formed so as to have a size which can be held and operated by a single hand. On the upper side of the PDA 11, there is a slot into which a memory stick 151 including a semiconductor memory can be inserted.

The memory stick 151 is a memory which is of one type of flash memory card developed by the present applicant, Sony Corporation. The memory stick 151 is formed by placing an electrically rewritable/erasable nonvolatile memory such as a flash memory (which is one type of EEPROM (Electrically Erasable Programmable Read-Only Memory) into a small-sized thin plastic case with a size of 21.5×50×2.8 mm. It is possible to read/write various kinds of data such as image data, audio data, and music data from/to the memory stick 151 via ten pin terminals.

Because the PDA 11 is capable of attaching such a memory stick 151, it is possible to share data with other electronic devices via the memory stick 151.

By installing a module (chip) for realizing an extended function into the memory stick 151 and attaching the memory stick 151 to the PDA 11, it is possible to further extend the functions of the PDA 11.

For example, if a memory stick 151 in which a Bluetooth module or a non-contact IC card is installed is attached to the PDA 11, it is possible to extend the functions of the PDA 11 so that the PDA 11 can communicate with the information board 1 by means of the Bluetooth technique and by means of an electromagnetic wave even if the PDA 11 itself does not have a Bluetooth module or a non-contact IC card.

On the lower side of the PDA 11, a modem (not shown) and a USB (Universal Serial Bus) port (not shown) for transmitting/receiving various kinds of data are disposed. As shown in FIG. 10, the PDA 11 also has a display unit 161, a set of keys 162, and a jog dial 163.

The display unit 161 includes a thin-type display device such as an LCD and serves to display a text, a still image, or a moving image. A touchpad 161A is disposed in an area below the display unit 161 so that a user can operate the PDA 11 by pressing the touchpad 161A with a finger, a pen, or the like.

Figure 11:
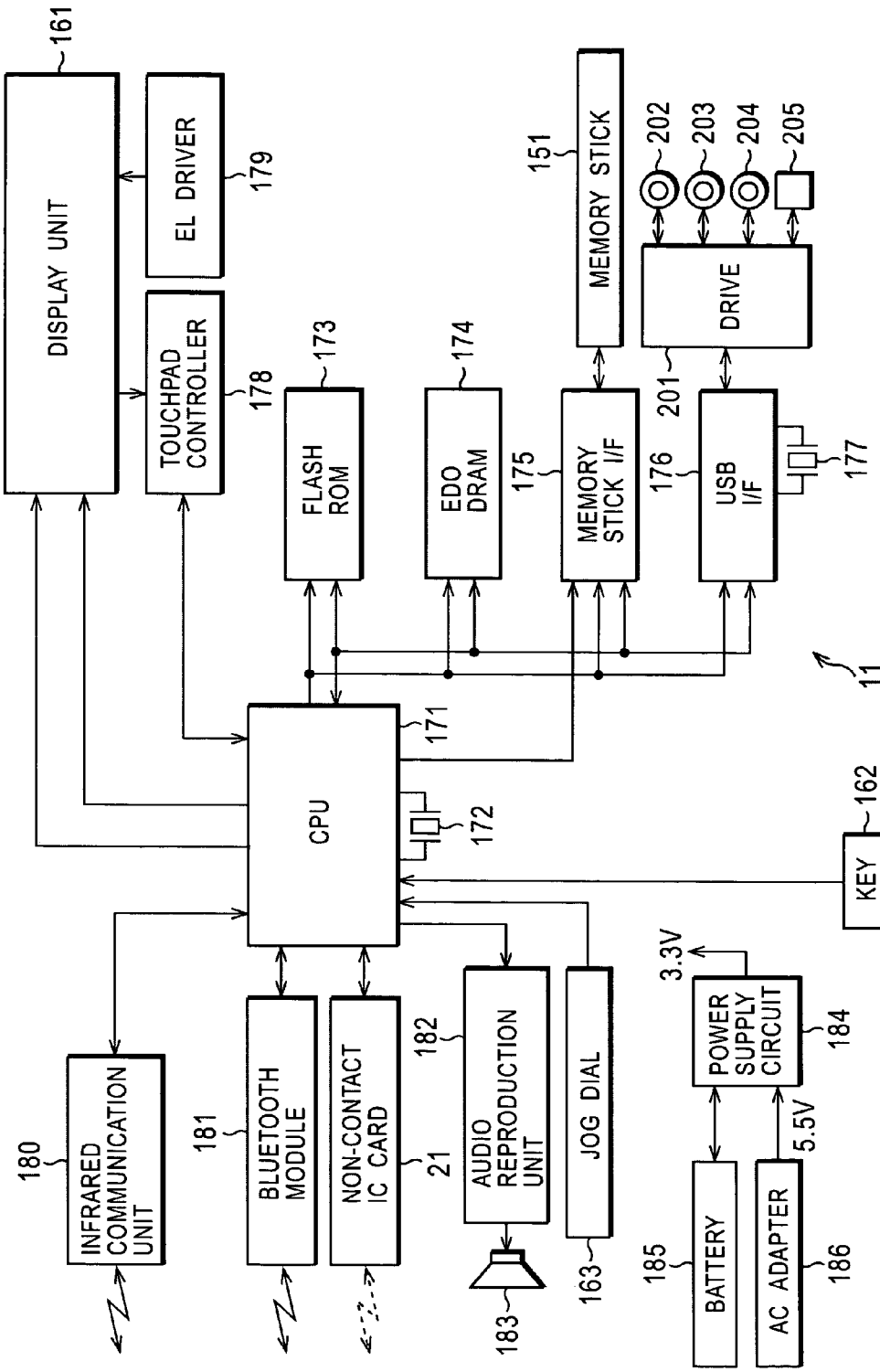
FIG. 11 is a block diagram showing an example of an internal structure of the PDA shown in FIG. 1.

The set of keys 162 is used by a user to input various commands to the CPU 171 (FIG. 11).

The jog dial 163 is used to select an icon or a thumbnail displayed on the display unit 161, by rotating it or pressing it toward the main body of the PDA 11.

FIG. 11 is a block diagram showing an example of an electrical construction of the PDA 11.

A CPU 171 executes various programs, such as an operating system and application programs, stored in a flash ROM 173 or an EDO DRAM (Extended Data Out Dynamic Random Access Memory) 174, in synchronization with a clock signal supplied from an oscillator 172.

The flash ROM 173, made up of a flash memory, stores a program executed by the CPU 171. Of various parameters used in computation, fixed parameters are also stored in the flash ROM 173. The EDO DRAM 174 stores a program executed by the CPU 171 and also stores parameters which may vary during computation.

A memory stick interface (I/F) 175 reads data from a memory stick 151 attached to the PDA 11 and also writes data supplied from the CPU 171 into the memory stick 151.

A USB interface (I/F) 176 operates, in synchronization with the clock signal supplied from the oscillator 177, to read data or a program from a drive 201, which is a USB device connected to the USB interface 176, and to transfer data supplied from the CPU 171 to the drive 201.

The drive 201 reads data or a program stored on a magnetic disk 202, an optical disk 203, a magnetooptical disk 204, or a semiconductor memory 205, which is mounted on the drive 202 as required, and the drive 201 supplies the data or the program read therefrom to the CPU 171 or the EDO DRAM 174 via the USB interface 176. The drive 201 also stores data or a program onto the magnetic disk 202, the optical disk 203, the magnetooptical disk 204, or the semiconductor memory 205, mounted on the drive 201.

The flash ROM 173, the EDO DRAM 174, the memory stick interface 175, and the USB interface 176 are connected to the CPU 171 via an address bus and a data bus.

The display unit 161 receives data from the CPU 171 via a LCD bus, and displays an image or a character in accordance with the received data. If a touchpad 161A disposed below the display unit 161 is operated, a touchpad controller 178 receives data corresponding to the operation (for example, data indicating coordinates of a touched point) from the display unit 161 and supplies a signal corresponding to the received data to the CPU 171 via a serial bus.

An EL (Electroluminescence) driver 179 drives an electroluminescence device disposed on the back of the display unit 161 and controls the brightness of the display unit 161.

If an infrared communication unit 180 receives data from the CPU 171, the infrared communication unit 180 transmits the received data in the form of an infrared ray signal to another device (not shown) via an UART (Universal Asynchronous Receiver-Transmitter). On the other hand, if the infrared communication unit 180 receives an infrared ray signal from another device, the infrared communication unit 180 supplies data corresponding to the received infrared ray signal to the CPU 171. That is, the infrared communication unit 180 allows the PDA 11 to communicate with another device via the UART.

A Bluetooth module 181 is constructed in a similar manner to the above-described Bluetooth module 45 of the information board 1. The Bluetooth module 181 is used to communicate, for example, with the information board 1. If the Bluetooth module 181 receives data transmitted from the information board 1, the Bluetooth module 181 transfers the received data to the CPU 171, which in turn, for example, displays the data on the display unit 161.

When the PDA 11 is brought close to, for example, the reader/writer 31A of the information board 1, if a non-contact IC card 21 receives an electromagnetic wave radiated from the reader/writer 31A, the non-contact IC card 21 transmits identification information indicating its card ID to the reader/writer 31A. The detailed structure of the non-contact IC card 21 will be described later.

An audio reproduction unit 182 reproduces voice/sound data supplied from the CPU 171 and generates a voice/sound corresponding to the data from a speaker 183. For example, in a case in which a music content is supplied from the information board 1, the audio reproduction unit 182 reproduces it and generates a music sound from the speaker 183.

A power supply circuit 184 generates electric power from a battery 185 installed on the PDA 11 or by means of converting the voltage supplied from an AC (Alternating Current) adapter 186, and supplies the electric power to various parts such as the CPU 171 and the audio reproduction unit 182.

Figure 12:
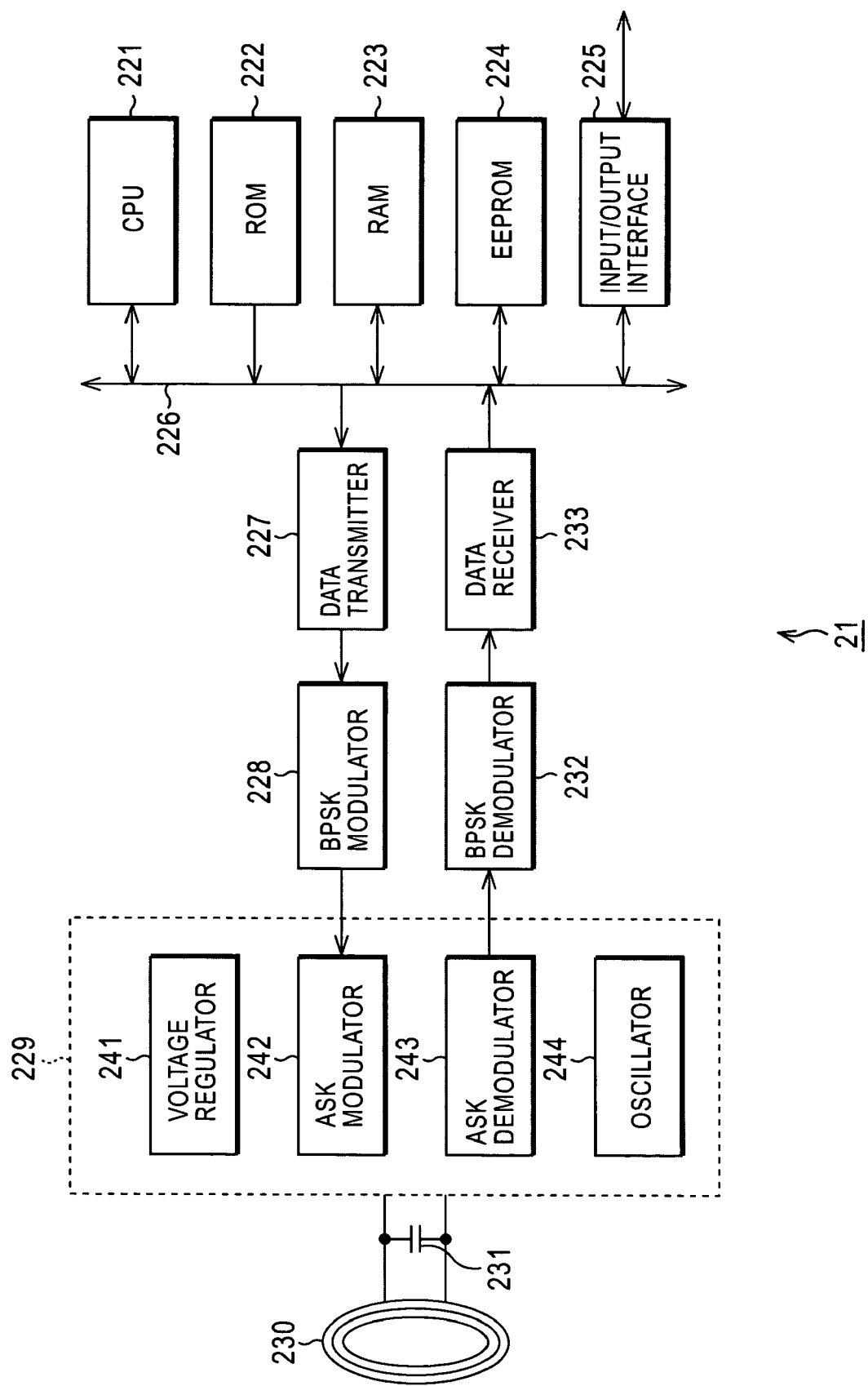
FIG. 12 is a block diagram showing an example of a structure of the non-contact IC card shown in FIG. 11.

FIG. 12 is a block diagram showing the detailed structure of the non-contact IC card 21 shown in FIG. 11.

The non-contact IC card 21 is constructed of, for example, an antenna (loop antenna) 230, a capacitor 231, and a one-chip integrated circuit in which the other components are formed. The non-contact IC card 21 is responsible for communicating, by means of half duplex communication using electromagnetic induction, with a reader/writer which is one of readers/writers 31A to 31D disposed on the information board 1 and close to which the PDA 11 is brought. In the following description, when it is not necessary to distinguish the readers/writers 31A to 31D from each other, each of them will be referred to simply as a reader/writer 31.

The non-contact IC card 21 is not necessarily needed to be constructed in the form of a card. The term "IC card" is intended to be used only for convenience in description, and it should be understood that any device having the functions which have been described above or which will be described later in conjunction with the term "IC card" can be employed. A specific example of a device having basically similar functions to those of the non-contact IC card 21 is a Felica (registered trademark) device.

The CPU 221 loads a control program from a ROM 222 into a RAM 223 and controls the operation of the entire non-contact IC card 21. For example, if an electromagnetic wave radiated by a reader/writer 31 brought close is received by an antenna 230, the CPU 221 transmits the card ID of the non-contact IC card 21 to the reader/writer 31.

The card ID may be identical to, or may include, the Bluetooth address assigned to the Bluetooth module 181 (PDA 11).

In an interface unit 229, an ASK demodulator 243 demodulates, by means of envelope detection, a modulated signal (ASK-modulated signal) received via the antenna 230 and outputs the resultant demodulated data to a BPSK demodulator 232. An LC circuit is formed of the antenna 230 and the capacitor 231, and resonance occurs therein for an electromagnetic wave with a particular frequency radiated from the reader/writer 31.

In the interface unit 229, the ASK demodulator 243 rectifies an AC magnetic field excited in the antenna 230, and a voltage regulator 241 regulates the resultant rectified voltage, which is supplied as DC power to various parts. The power of the electromagnetic wave radiated from the reader/writer 31 is adjusted, as will be described later, so as to generate a magnetic field which provides power needed for the non-contact IC card 21 to operate.

Furthermore, in the interface unit 229, an oscillator 244 generates a signal with the same frequency as the clock frequency of data and outputs the generated signal to a PLL circuit (not shown).

Furthermore, in the interface unit 229, when data such as the card ID is transmitted to the reader/writer 31, a switching device is turned on and off in accordance with the data supplied from the BPSK modulator 228 so that a predetermined load is connected in parallel with the antenna 230 only when the switching device is in the on-state thereby changing the load of the antenna 230.

An ASK modulator 242 modulates a modulated signal from the reader/writer 31, being received by the antenna 230, by changing the load of the antenna 230 thereby transmitting the modulated component to the reader/writer 31 via the antenna 230 (and thus changing the terminal voltage of the antenna 105 of the reader/writer) (this technique is known as load switching).

If the BPSK demodulator 232 receives BPSK-modulated data demodulated by the ASK demodulator 243, the BPSK demodulator 232 demodulates (Manchester-decodes) the received data in accordance with the clock signal supplied from the PLL circuit (not shown) and outputs the resultant demodulated data to a data receiver 233. The data receiver 233 transfers the received data to the CPU 221 or the like as required.

The BPSK modulator 228 performs BPSK modulation (Manchester coding) on data supplied from a data transmitter 227 and outputs the resultant modulated data to the ASK modulator 242.

In addition to transmission of the card ID to the information board 1, the non-contact IC card 21 also performs other various processes including authentication with the reader/writer 31 and decryption of data to be transmitted.

Figures 13, 14:
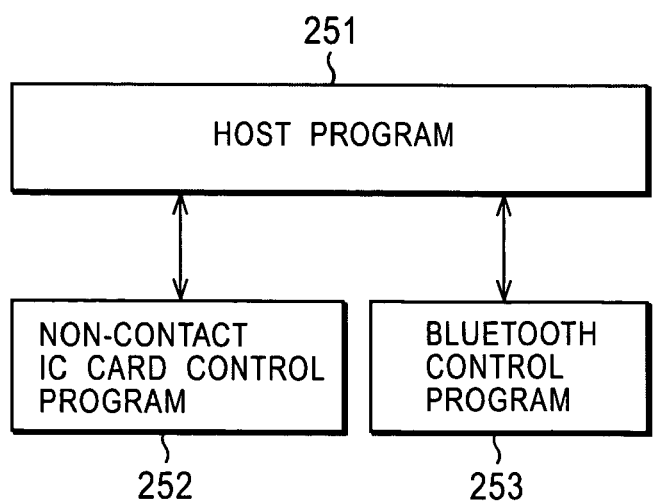
FIG. 13 is a diagram showing specifications associated with communication performed between a reader/writer of an information board and a non-contact IC card of a PDA.
FIG. 14 is a block diagram showing an example of a functional construction of the PDA shown in FIG. 1.

FIG. 13 is a diagram showing examples of specifications of the non-contact IC card 21 and the reader/writer 31.

As described earlier, the communication between the non-contact IC card 21 and the reader/writer 31 disposed on the information board 1 is performed by means of half-duplex communication at a transmission rate of, for example, 211.875 kbps.

As shown in FIG. 13, transmission of electric power and data from the reader/writer 31 to the non-contact IC card 21 and transmission of data from the non-contact IC card 21 to the reader/writer 31 are performed using a frequency band whose center frequency is, for example, 13.56 MHz.

The power of the electromagnetic wave output from the reader/writer 31 to transmit electric power is, for example, 350 mW, and the communication distance is about 10 cm, although it depends on the communication environment such as the characteristic of the antenna. Thus, in FIG. 1, the distances between the information requesting unit 3A and the other information requesting units should be greater than, at least, 10 cm so that the communication is not influenced by electromagnetic waves from the other readers/writers.

The communication distance may be reduced by reducing the output power of the reader/writer 31. In this case, a grater number of information requesting units may be disposed on the information board 1.

The transmission of data from the reader/writer 31 to the non-contact IC card 21 is performed, as described above, by performing ASK modulation on Manchester-coded data with a modulation factor (the ratio of the maximum amplitude of a data signal to the maximum amplitude of a carrier signal) equal to, for example, about 0.1. On the other hand, transmission of data from the non-contact IC card 21 to the reader/writer 31 is performed, as described above, by converting output data into a transmit signal using the load switching technique (by turning on and off of the switching device in accordance with the output data thereby changing the load of the antenna 105).

FIG. 14 is a block diagram showing an example of the functional construction of the PDA 11.

A host program 251 provides fundamental functions to the PDA 11. A non-contact IC card control program 252 controls the non-contact IC card 21. More specifically, for example, when an electromagnetic wave radiated from the reader/writer 31 is received, the non-contact IC card control program 252 controls the non-contact IC card 21 such that the card ID assigned to the non-contact IC card 21 is transmitted to the reader/writer 31. On the other hand, if a command to rewrite the card ID is issued by a user of the PDA 11, the non-contact IC card control program 252 controls the non-contact IC card 21 such that the card ID stored in the EEPROM 224 is rewritten in accordance with the rewrite command.

A Bluetooth control program 253 controls the operation of the Bluetooth module 181, in communication with another Bluetooth device and in rewriting of the Bluetooth device name stored in the flash memory 64A (flash memory of the Bluetooth module 181).

The operation of the information providing system shown in FIG. 1 is described below.

First, referring to flow charts shown in FIGS. 15 and 16, a processing sequence associated with the information providing system shown in FIG. 1 is described below. In order to clearly show the difference between a process performed by a PDA 11 having a non-contact IC card 21 and a process performed by a PDA 11 having no non-contact IC card 21, a process performed by a Bluetooth device (another terminal) having no non-contact IC card present near the information board 1 is also described.

As for the operation of the information board 1, processes performed by the host program 131, the reader/writer control programs 132A and 132B, and the Bluetooth control program 133 are described. Note that the reader/writer control program 132C and 132D also perform processing in a similar manner to the reader/writer control program 132A.

In step S31 and step S41, respectively, the reader/writer control program 132A and the reader/writer control program 132B radiate an electromagnetic wave for detecting a terminal (PDA 11) having a non-contact IC card 21 installed therein. More specifically, for example, the reader/writer control program 132A controls the reader/writer 31A using a control command so as to radiate an electromagnetic wave at predetermined intervals from the antenna 105A.

In step S51, the non-contact IC card control program 252 of the PDA 11 determines whether an electromagnetic wave radiated from one of the readers/writers 31A to 31B of the information board 1 has been received. The process waits until reception of an electromagnetic wave is detected in step S51.

For example, if the PDA 11 is brought close to the information requesting unit 3B as shown in FIG. 1, then, in step S51, the non-contact IC card control program 252 determines that an electromagnetic wave radiated from the reader/writer 31B has been received, and thus the process proceeds to step S52.

In step S52, the non-contact IC card control program 252 reads the card ID (Bluetooth address) from the EEPROM 224 and transmits it to the reader/writer 31B.

In step S42, the reader/writer control program 132B of the information board 1 receives the Bluetooth address transmitted from the non-contact IC card 21. Thereafter, the process proceeds to step S43, in which the received Bluetooth address is transferred to the Bluetooth control program 133.

In step S11, the Bluetooth control program 133 receives the Bluetooth address. That is, before the Bluetooth control program 133 performs processing such as inquiry, the Bluetooth control program 133 acquires the Bluetooth address of the PDA 11 to which communication will be performed after piconet synchronization is achieved.

In step S44, the reader/writer control program 132B transmits the identification information of the reader/writer 31B to the host program 131. This identification information is used to acquire a content to be (retrieved and then) provided to the PDA 11.

In step S1, the host program 131 receives the content identification information transmitted from the reader/writer control program 132B, and acquires the content corresponding to the received content identification information in accordance with a proper timing scheme.

Thereafter, in steps S12 to S14, the Bluetooth control program 133 performs "inquiry" and then performs "calling" in steps S16 to S19. Basically, the "inquiry" is a process for detecting Bluetooth devices (the PDA 11 and another terminal) present in the vicinity of the information board 1, and the "calling" is a process for transmitting the attribute information (the Bluetooth address, the Bluetooth clock, etc.,) of the master device to the detected Bluetooth devices.

In step S12, the Bluetooth control program 133 controls the Bluetooth module 45 so as to broadcast an IQ packet to detect slave devices present in the vicinity.

More specifically, the Bluetooth control module 133 generates an inquiry frequency hopping pattern using 24 bits (9E8B33) of the LAP and 4 bits (each of which has a value of 0) of the UAP and all 28 bits of the Bluetooth clock.

Furthermore, the Bluetooth control program 133 generates an IAC (Inquiry Access Code) using one address block of the preset LAP of 9E8B00 to 9E8B3F and broadcasts the generated access code as an IQ packet using the calculated inquiry hopping pattern.

Each packet transmitted in Bluetooth communication consists of a 68-bit or 72-bit access code basically indicating the destination of the packet, a 54-bit packet header including a parameter for managing a communication link, and a payload having a (variable) length of 0 to 2745 bits indicating user data.

The IQ packet, broadcasted from the antenna 4 via the processes performed by various parts of the Bluetooth module 45, is received, in step S61, by the Bluetooth control program 253 of the PDA 11 and also received, in step S81, by the Bluetooth control program by another terminal.

In step S62, the Bluetooth control program 253 of the PDA 11 transmits an FHS packet to notify the information board 1 of the attribute as the slave device and responds to inquiry. The FHS packet includes, in its payload, information associated with the Bluetooth address of the Bluetooth module 181 and the Bluetooth clock.

The transmitted FHS packet is received, in step S13, by the Bluetooth control program 133 of the information board 1 and thus the Bluetooth control program 133 acquires the attribute information of the PDA 11.

In step S82, an FHS packet indicating the attribute of the "another terminal" is transmitted in a similar manner, and is received, in step S14, by the Bluetooth control program 133.

By means of the "inquiry" described above, the Bluetooth control program 133 acquires attribute information of all slave devices present in the neighborhood.

In step S15, the Bluetooth control program 133 searches the acquired FHS packets to detect a slave device having the same Bluetooth address (card ID) as that acquired via the electromagnetic wave. The Bluetooth control program 133 determines the detected slave device as a terminal with which to communicate, that is, as a terminal which is requesting information. In this specific example, the Bluetooth control program 133 has already acquired the Bluetooth address of the PDA 11 via the reader/writer control program 132B, and thus the Bluetooth control program 133 determines that a PDA 11, from which an FHS packet including the same Bluetooth address has been received, is a terminal with which to communicate.

Thereafter, the Bluetooth control program 133 calls only the PDA 11 determined in step S15 as the terminal with which to communicate. That is, the following process is not performed with the Bluetooth control program of any other terminal.

In step S16, the Bluetooth control program 133 generates an ID packet in accordance with the information described in the FHS packet acquired from the PDA 11 and transmits the generated ID packet to the PDA 11.

More specifically, the Bluetooth control program 133 calculates a call frequency hopping pattern using 24 bits of the LAP and lower-order 4 bits of the UAP of the Bluetooth address and also 28 bits of the Bluetooth clock, included in the FHS packet.

Furthermore, the Bluetooth control program 133 generates a DAC (Device Access Code) using the LAP of the Bluetooth address and transmits the generated DAC as an ID packet to the PDA 11, using the calculated call hopping pattern.

If the Bluetooth control program 253 receives, in step S63, the ID packet, the process proceeds to step S64. In step S64, the Bluetooth control program 253 transmits an ID packet identical to the received ID packet to the information board 1 to notify the information board 1 that the ID packet has been successfully received.

If the Bluetooth control program 133 receives, in step S17, the ID packet transmitted from the PDA 11, the process proceeds to step S18. In step S18, the Bluetooth control program 133 transmits an FHS packet indicating the attribute of the master device to the PDA 11.

In step S65, the Bluetooth control program 253 receives the FHS packet transmitted from the information board 1 thereby acquiring the attribute information of the master device.

Then in the next step S66, the Bluetooth control program 253 transmits an ID packet to the information board 1 to notify it that the FHS packet has been successfully received.

In step S67, the Bluetooth control program 253 achieves piconet synchronization with the information board 1.

More specifically, the Bluetooth control program 253 generates a channel frequency hopping pattern using 24 bits of the LAP and lower-order 4 bits of the UAP of the Bluetooth address received from the information board 1 (the Bluetooth module 45) and also using 27 bits of the Bluetooth clock and establishes synchronization in the frequency domain using the generated channel frequency hopping pattern.

In accordance with the Bluetooth clock received from the information board 1, the Bluetooth control program 253 adds an offset (difference) to the Bluetooth clock managed by the Bluetooth control program 253 so that synchronization in terms of time is achieved.

If the Bluetooth control program 133 receives, in step S19, the ID packet transmitted from the PDA 11, the process proceeds to step S20. In step S20, the Bluetooth control program 133 notifies the host program 131 that synchronization with the terminal to which information is to be provided, that is, the PDA 11, has been achieved.

If the host program 131 receives, in step S2, the notification, the host program 131 acquire a content in accordance with the identification information of the reader/writer 31B, which was already received in step S1. As described earlier, the content storage unit 44 stores the table indicating the correspondence between the identification information of each reader/writer 31A to 31D and the content to be provided.

For example, in the case in which various kinds of information such as those shown in FIG. 2 are available from the information board 1, in accordance with the identification information of the reader/writer 31B received from the reader/writer control program 132B, the host program 131 reads a content associated with "Restaurant Alice" from the content storage unit 44 thereby acquiring the content.

In step S4, the host program 131 commands the Bluetooth control program 133 to transmit the content acquired in step S3.

If the Bluetooth control program 133 receives, in step S21, the content transmit command, the process proceeds to step S22. In step S22, the Bluetooth control program 133 controls various parts of the Bluetooth module 45 so as to transmit the content from the antenna 4 to the PDA 11.

In step S68, the Bluetooth control program 253 of the PDA 11 receives the content transmitted from the information board 1. Thereafter, the Bluetooth control program 253 supplies the received content to the host program 131, which in turn, for example, displays it on the display unit 161.

Thus, the user can view, on the PDA 11, detailed information associated with the guide displayed on the display unit 2B simply by bringing the PDA 11 close to the information requesting unit 3B of the information board 1. In this specific case, for example, a menu of dishes available in "Restaurant Alice" is displayed together with associated images.

In the Bluetooth communication, a profile indicating a data transmission scheme is selected after achieving synchronization between terminals. For example, in communication between the non-contact IC card 21 and the reader/writer 31, profiles available in them may be transmitted between them and a proper profile may be selected in a process performed by, for example, the Bluetooth control program 133.

When communication is performed for the first time between the information board 1 and the PDA 11, it is generally requested to input a PIN (Personal Identification Number) code necessary for authentication. The inputting of the PIN code may not be performed. Alternatively, as with the profile, the same PIN code may be shared by means of communication between the non-contact IC card 21 and the reader/writer 31B.

In the case in which the Bluetooth address of the PDA 11 is transmitted and synchronization within a piconet can be achieved on the basis of the Bluetooth address of the PDA 11 (without needing the Bluetooth clock), "inquiry" by the Bluetooth control program 133 may not be preformed.

In the above-described embodiment, on the basis of the Bluetooth address of the PDA 11 received from the non-contact IC card 21, the information board 1 identifies a terminal with which to establish synchronization, and provides a content to that terminal after achieving the synchronization. Alternatively, a terminal with which to communicate may be identified on the basis of the Bluetooth device name of the PDA 11 received from the non-contact IC card 21 and a contact may be provided to that terminal.

In this case, the card ID supplied from the IC card 21 has to include at least the Bluetooth device name of the PDA 11 so that the information board 1 can identify the terminal (PDA 11) requesting for providing information, on the basis of the Bluetooth device name of the PDA 11.

Figure 15:
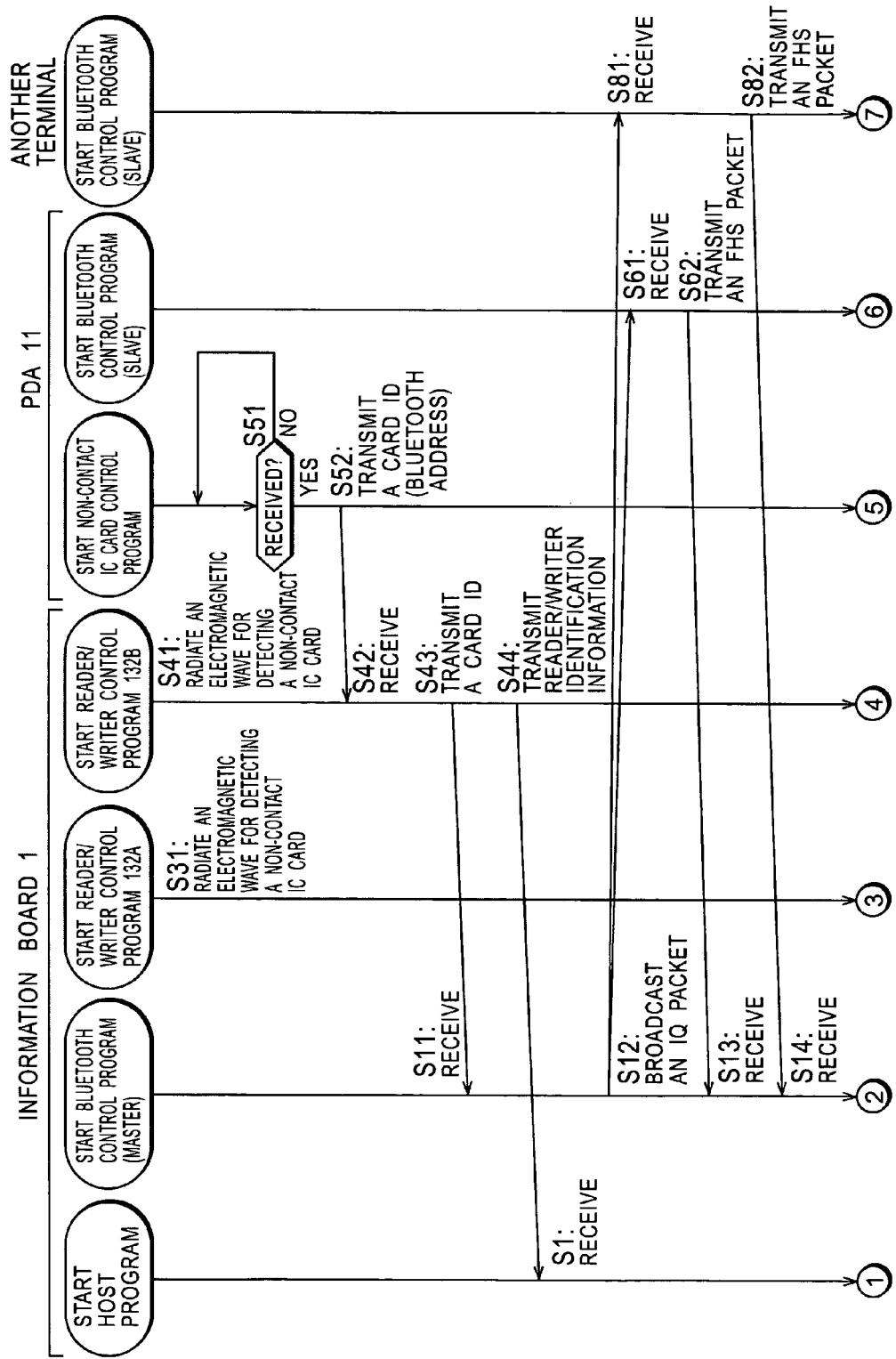
FIG. 15 is a flow chart showing a process performed in the information providing system shown in FIG. 1.
Figure 16:
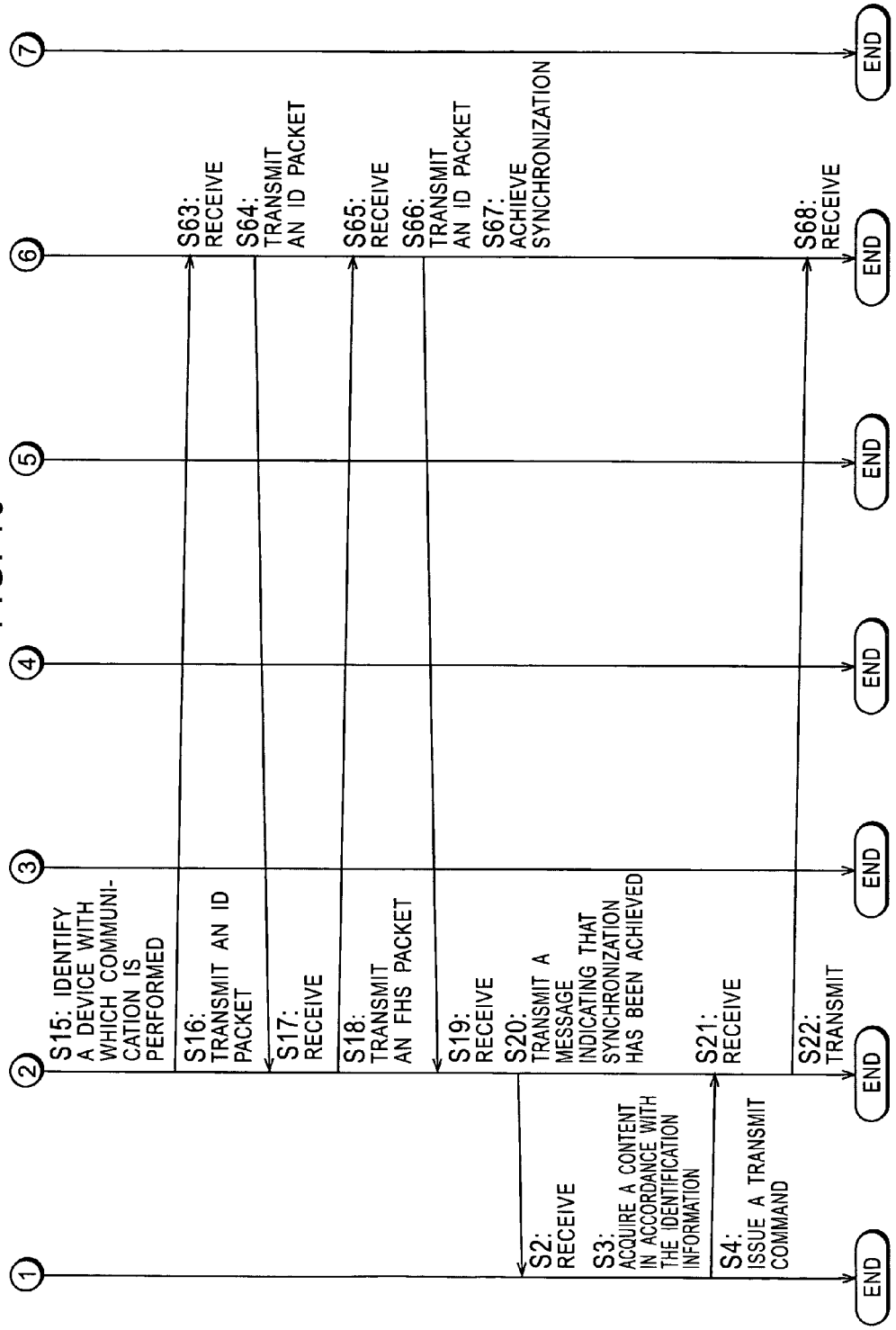
FIG. 16 is a flow chart showing a process, following that shown in FIG. 15, performed in the information providing system shown in FIG. 1.
Figure 17:
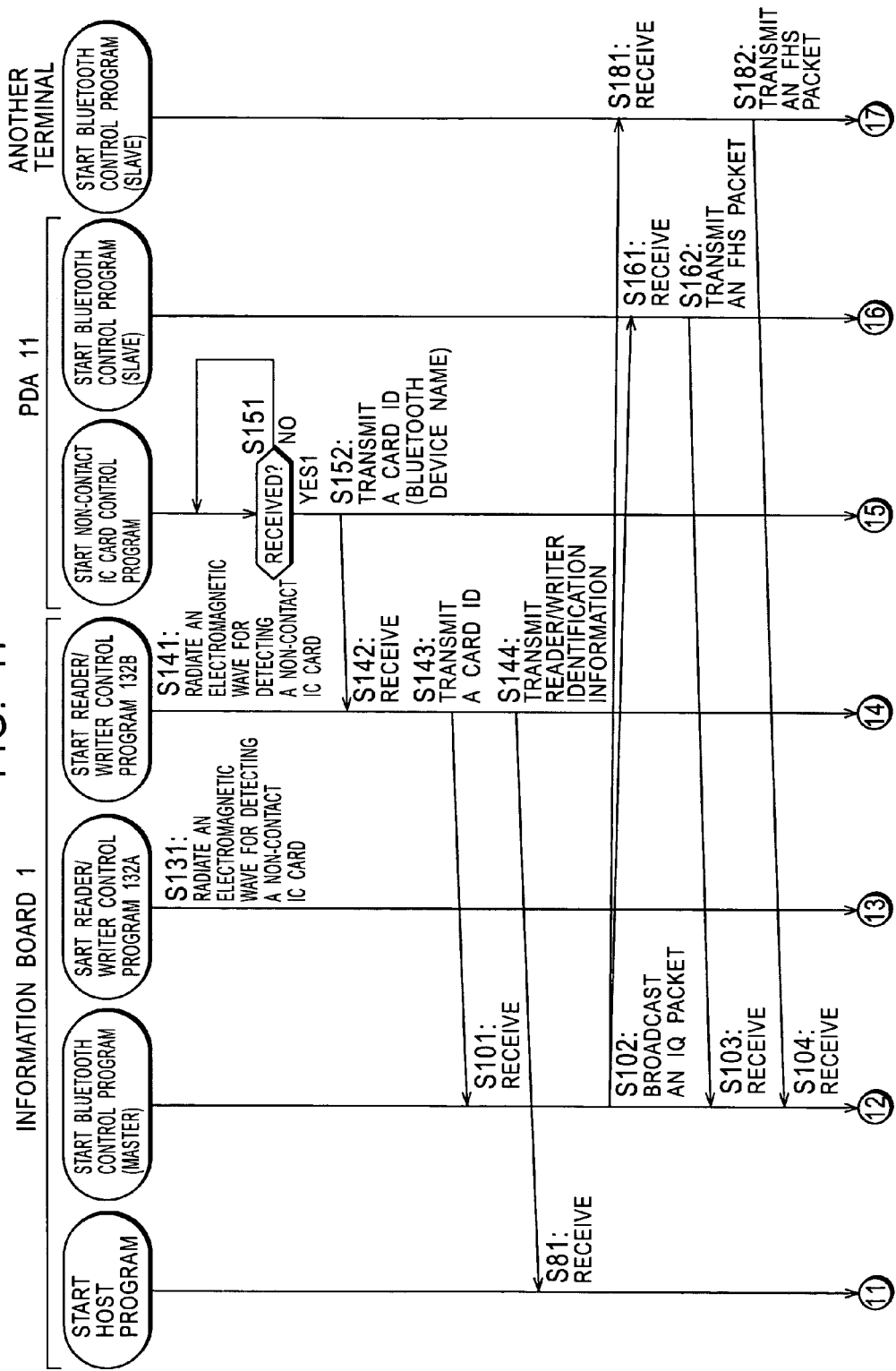
FIG. 17 is a flow chart showing another process performed in the information providing system shown in FIG. 1.
Figure 18:
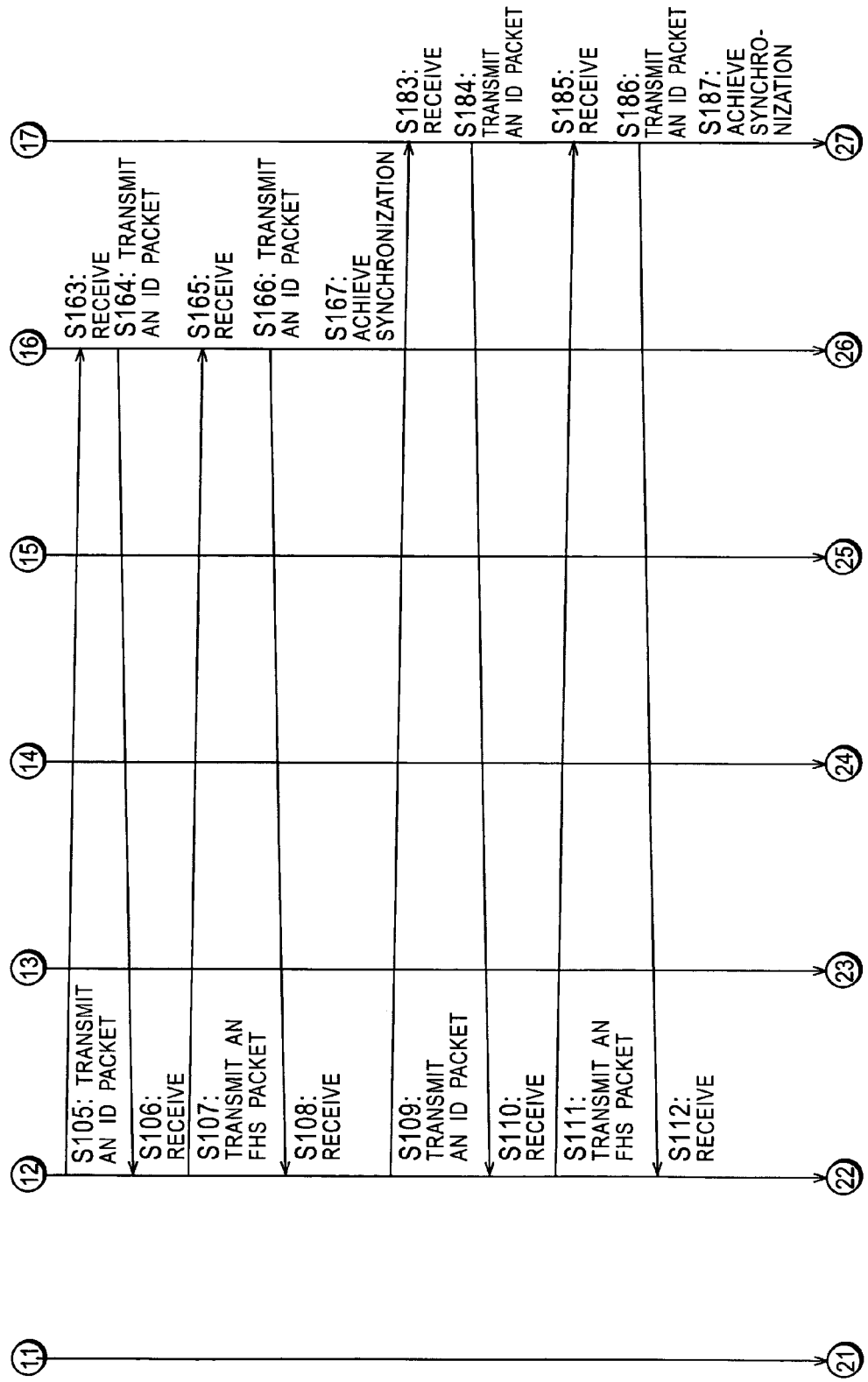
FIG. 18 is a flow chart showing a process, following that shown in FIG. 17, performed in the information providing system shown in FIG. 1.
Figure 19:
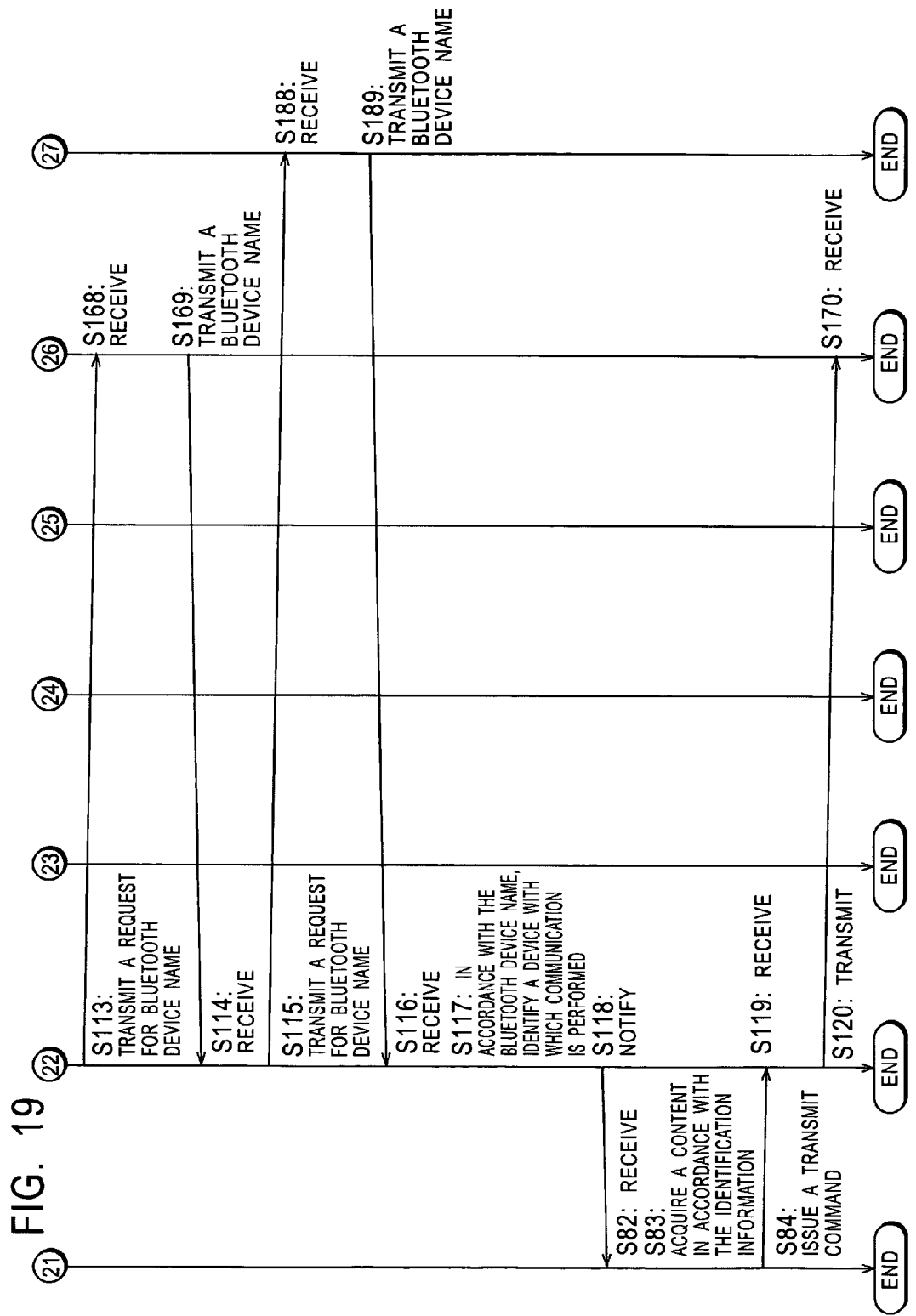
FIG. 19 is a flow chart showing a process, following that shown in FIG. 18, performed in the information providing system shown in FIG. 1.

Now referring to flow charts shown in FIGS. 17 to 19, a processing sequence performed by the information providing system, shown in FIG. 1, to identify a terminal on the basis of a Bluetooth device name supplied as a card ID and provide a content to the terminal is described.

the process shown in FIG. 17 is similar to that shown in FIG. 15 except that a card ID indicating a Bluetooth device name is supplied from a non-contact IC card 21 when it is brought close to the information board 1.

For example, if the PDA 11 is brought close to the information requesting unit 3B of the information board 1, then, in step S152, the card ID indicating the Bluetooth device name is read by the non-contact IC card control program 252 of the PDA 11 and transmitted to the information board 1.

If the reader/writer control program 132B receives, in step S142, the card ID transmitted from the non-contact IC card control program 252, the reader/writer control program 132B transfers the received card ID to the Bluetooth control program 133, and the reader/writer control program 132B transmits the identification information of the reader/writer 31B to the host program 131.

Thereafter, "inquiry" is performed between the Bluetooth program 133 of the information board 1 and the Bluetooth control program 253 of the PDA 11 or the Bluetooth control program of another terminal.

In steps S105 to S108, the Bluetooth control program 133 performs "calling" with the Bluetooth control program 253 of the PDA 11 to achieve synchronization with the PDA 11. In steps S109 to S112, the Bluetooth control program 133 performs "calling" with the Bluetooth control program of the "another terminal" to achieve synchronization with the "another terminal".

In the case in which the information board 1 serving as the master device achieves synchronization with a plurality of slave devices, the calling process described above is performed repeatedly for the respective slave devices thereby increasing the number of slave devices forming the piconet.

After completion of synchronization with all slave devices in the piconet, the Bluetooth control program 133 requests the respective slave devices to transmit their Bluetooth device name. In step S113, the Bluetooth control program 133 requests the PDA 11 to transmit the Bluetooth device name thereof.

Alternatively, a request for a Bluetooth device name may be issued each time the synchronization with each Bluetooth device has been achieved (each time "calling" has been completed).

If the Bluetooth control program 253 receives the request in step S168, the process proceeds to step S169. In step S169, the Bluetooth control program 253 reads the Bluetooth device name stored in the flash memory 64A and transmits it.

The Bluetooth device name transmitted from the PDA 11 is received, in step S114, by the Bluetooth control program 133.

In step S115, the Bluetooth control program 133 requests the "another terminal" to transmit its Bluetooth device name. In step S116, the Bluetooth control program 133 receives a response from the "another terminal".

In step S117, the Bluetooth control program 133 detects, from a plurality of slave devices from which their Bluetooth device names have been received, a slave device having the same Bluetooth device name as that which was already received from the reader/writer control program 132B and determines it as a device with which to communicate. In step S118, the Bluetooth control program 133 notifies the host program 131 that the device, with which to communicate, has been determined.

If the host program 131 receives, in step S82, the notification, the process proceeds to step S83. In step S83, the host program 131 acquires a content, to be provided, from the content storage unit 44 in accordance with the identification information of the reader/writer 31B received from the reader/writer control program 132B.

In step S84, the host program 131 commands the Bluetooth control program 133 to transmit the acquired content.

If the Bluetooth control program 133 receives the command in step S119, the process proceeds to step S120. In step S120, the Bluetooth control program 133 controls various parts of the Bluetooth module 45 so as to transmit the content from the antenna 4 to the PDA 11.

If the content transmitted from the information board 1 is received in step S170, the Bluetooth control program 253 of the PDA 11 transfers the received content to the host program 251, which in turn outputs it using the display unit 161 or the like.

As described above, it is also possible for the information board 1 to identify a terminal to which a content is to be provided, on the basis of a Bluetooth device name received from a non-contact IC card 21.

Figure 20:
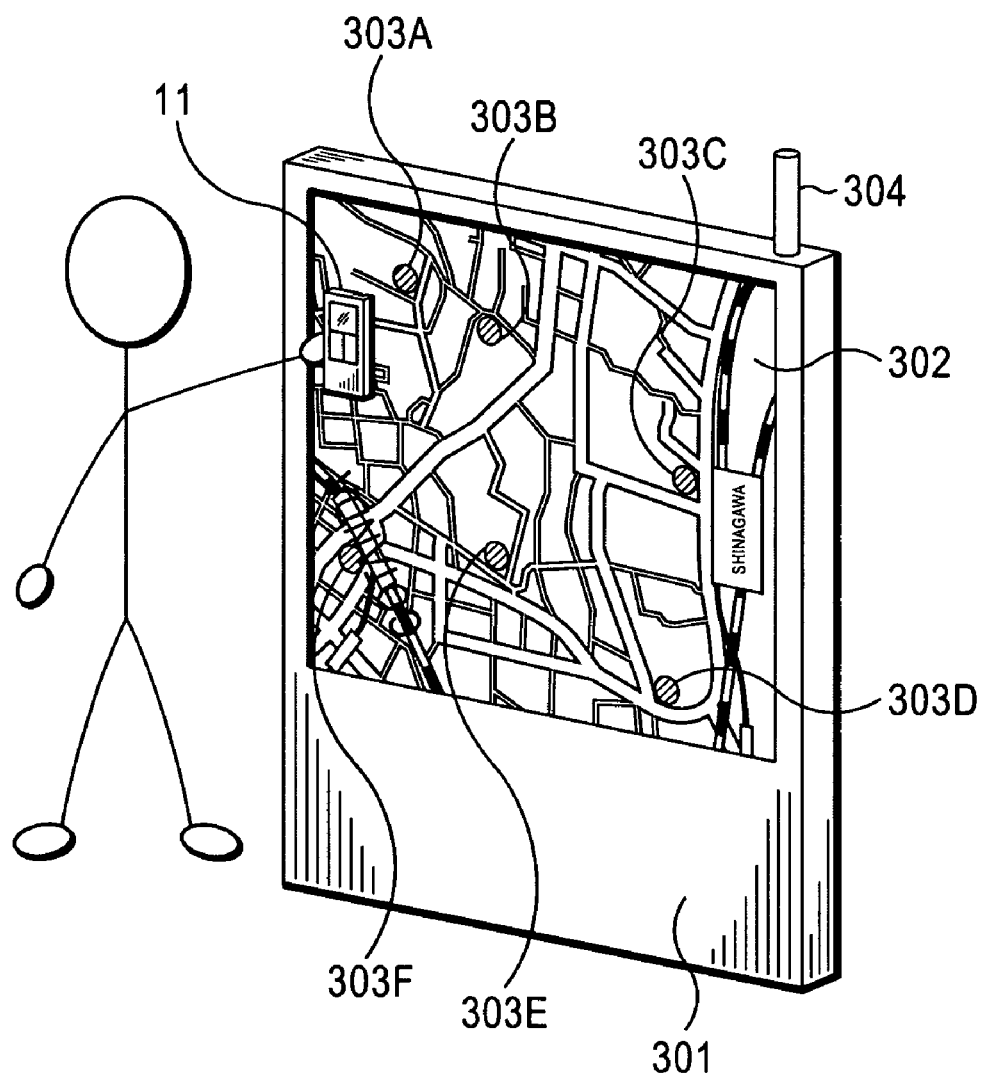
FIG. 20 is a diagram showing another example of an information providing system according to the present invention.

FIG. 20 is a diagram showing another example of the construction of the information board according to the present invention.

This information board 301 may be installed, for example, at a sightseeing spot to provide to users detailed information about noted places or buildings in the neighborhood.

As shown in FIG. 20, the information board 301 has a display unit 302, on which a map is displayed. On the maps, at positions corresponding to the locations of the noted places of buildings, information requesting units 303A to 303F are disposed. Near the respective information requesting units 303A to 303F, the names of the corresponding noted places or buildings are displayed.

In this information board 301 constructed in the above-described manner, when a user wants to view information about a building guided by, for example, the information requesting unit 303A, the user brings a PDA 11 close to the information requesting unit 303A, as shown in FIG. 20.

In response, as described earlier, the Bluetooth address or the Bluetooth device name of the PDA 11 is transmitted, as the card ID, from the non-contact IC card 21 of the PDA 11 to the information board 301. On the basis of the received card ID, the information board 301 identifies the device with which to communicate. Furthermore, the information board 301 acquires a content to be transmitted to the PDA 11, in accordance with the identification information of the reader/writer of the information requesting unit 303A. The information board 301 transmits the acquired content to the PDA 11 from an antennal 304 by means of Bluetooth communication.

In the PDA 11, the history of the building specified by the user and/or detailed information associated with it, such as information about transportation to the building, are output in the forms of text data, a still image, a moving image, or a voice. The data may be accessed when the PDA 11 is present within a Bluetooth communication range, or the data may be stored into a memory stick 151 or the like installed on the PDA 11.

Figure 21:
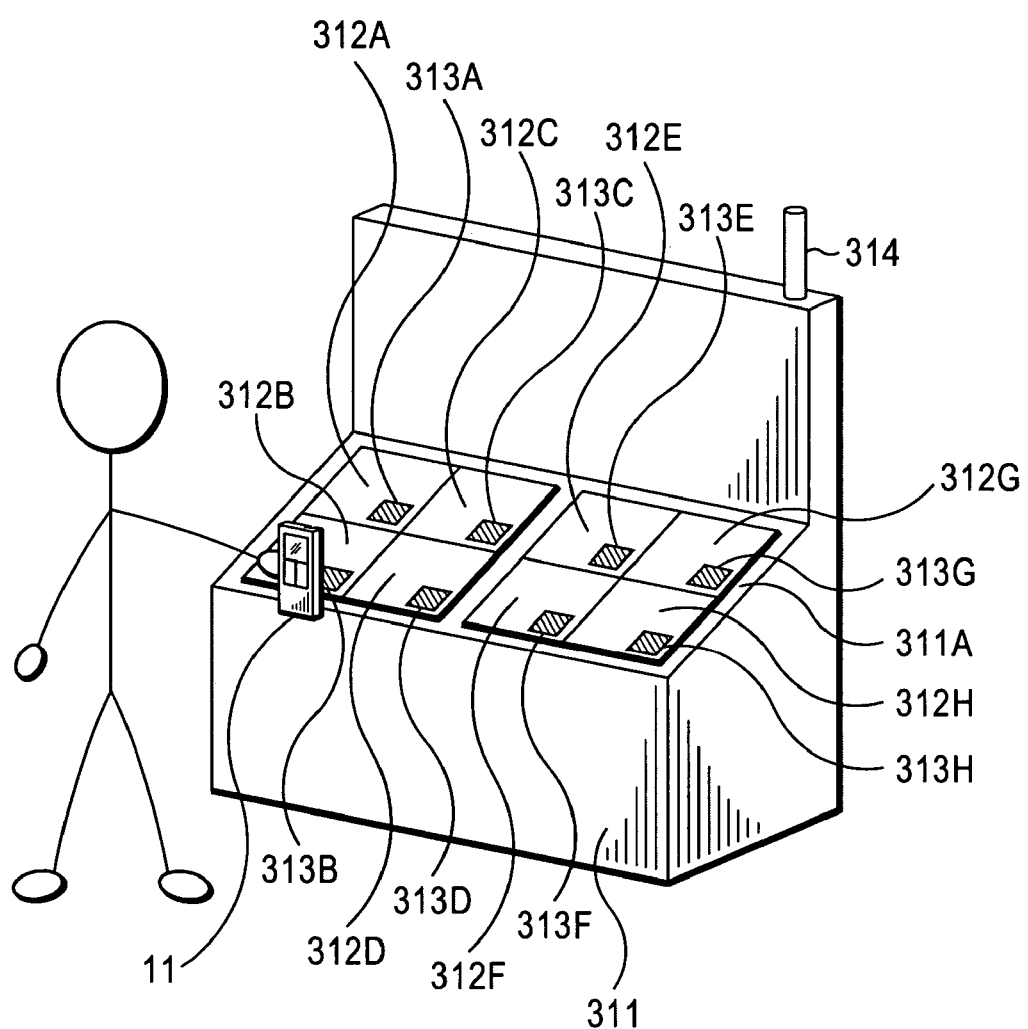
FIG. 21 is a diagram showing still another example of an information providing system according to the present invention.

FIG. 21 shows still another example of the construction of the information board according to the present invention.

In this example, a plane 311A of the information board 311 is slightly inclined upward from the horizontal plane so that a user of the information board 311 can put the PDA 11 on the plane 311A.

Display units 312A to 312H are disposed on the plane 311A, information requesting units 313A to 313H are disposed on the display unit 312A to 312H, respectively. On the respective display units 312A to 312H, guides of available information, similar to that described earlier with reference to FIG. 2, are displayed. When a user wants to view detailed information corresponding to, for example, the guide displayed on the display unit 312B, the user puts the PDA 11 on the information requesting unit 313B.

In response, the process is performed in a similar manner as described above. That is, a content to be provided to the PDA 11 is acquired on the basis of a card ID read from the non-contact IC card 21 of the PDA 11 and the identification information of the reader/writer disposed in the information requesting unit 313B, and the acquired content is transmitted to the PDA 11 from the antenna 314.

The information board such as that shown in FIG. 1, 20, or 21 may be installed at various places, such as a test-listening spot in a record shop, a movie theater in which a plurality of movies are shown, or a department store.

For example, in the case in which the information board 311 such as that shown in FIG. 21 is installed at a pre-listening spot in a record shop, jacket pictures of CDs (Compact Disks) which can be listened for evaluation and associated simple descriptions are displayed on the respective display units 312A to 312H. If a user gets interested in a certain CD, the use puts the PDA 11 on a corresponding information requesting unit. For example, in the case in which a user wants pre-listening of a CD displayed on the display unit 312B, the user puts the PDA 11 on the information requesting unit 313B.

In response, the information board 311 achieves communication with the PDA 11 on the basis of the card ID read from the non-contact IC card 21 of the PDA 11 and transmits a music content acquired on the basis of the identification information of the reader/writer of the information requesting unit 313B from the antenna 314 by means of, for example, the Bluetooth communication technique.

If a headphone or the like is connected to the PDA 11, the user can listen to a desired CD using the headphone. A Bluetooth address specified by a card ID may correspond to a headphone (Bluetooth device worn by a user. In this case, a music content is directly transmitted to the headphone from the information board 311.

A picture of a jacket or words of a song may be displayed on the display unit 161 of the PDA 11. At such a pre-listening spot, if a user goes out of a Bluetooth communication range of the information board 311, pre-listening is forcibly terminated. If the user likes the pre-listened music, the user may purchase a corresponding music content by operating the PDA 11.

In a case in which an information board 311 such as that shown in FIG. 21 is installed in a movie theater, a user may view a promotion movie corresponding to a desired movie by putting the PDA 11 on a corresponding information requesting unit, in a similar manner as in the case of pre-listening of music.

A coupon which can be used at a shop may be issued to a user who has viewed a guide.

In the examples described above in which a plurality of readers/writers are disposed on the information board, the information board identifies a terminal to which a content is to be provided, on the basis of a card ID which is read via a reader/writer, and the information board acquires the content to be provided. Conversely, a plurality of non-contact IC cards may be disposed on the information board. In this case, identification information of a non-contact IC card is read by a reader/writer disposed on a terminal such as a PDA 11, and an information transmit request is issued from the PDA 11 to the information board.

For example, each of the information requesting units 3A to 3D of the information board 1 shown in FIG. 1 has its own non-contact IC card. If a user wants to get some information corresponding to a guide displayed on one of the display units 2A to 2D, the user reads the information stored in a corresponding non-contact IC card, by using a reader/writer disposed in the PDA 11.

More specifically, for example, identification information of a content and a Bluetooth address (or a Bluetooth device name) of the information board 1 (the Bluetooth module 45) are stored in the non-contact IC card of each of the information requesting units 3A to 3D, and the PDA 11 achieves Bluetooth communication with the information board 1 in accordance with the Bluetooth address read from a non-contact IC card. After achieving Bluetooth communication, the PDA 11 transmits the identification information, read from the non-contact IC card, of the content to the information board 1 and requests the information board 1 to transmit a content corresponding to the identification information.

Also in this case, a user can acquire a desired content simply by putting the PDA 11 including the reader/writer disposed therein into a range close to the information board 1.

Figure 22:
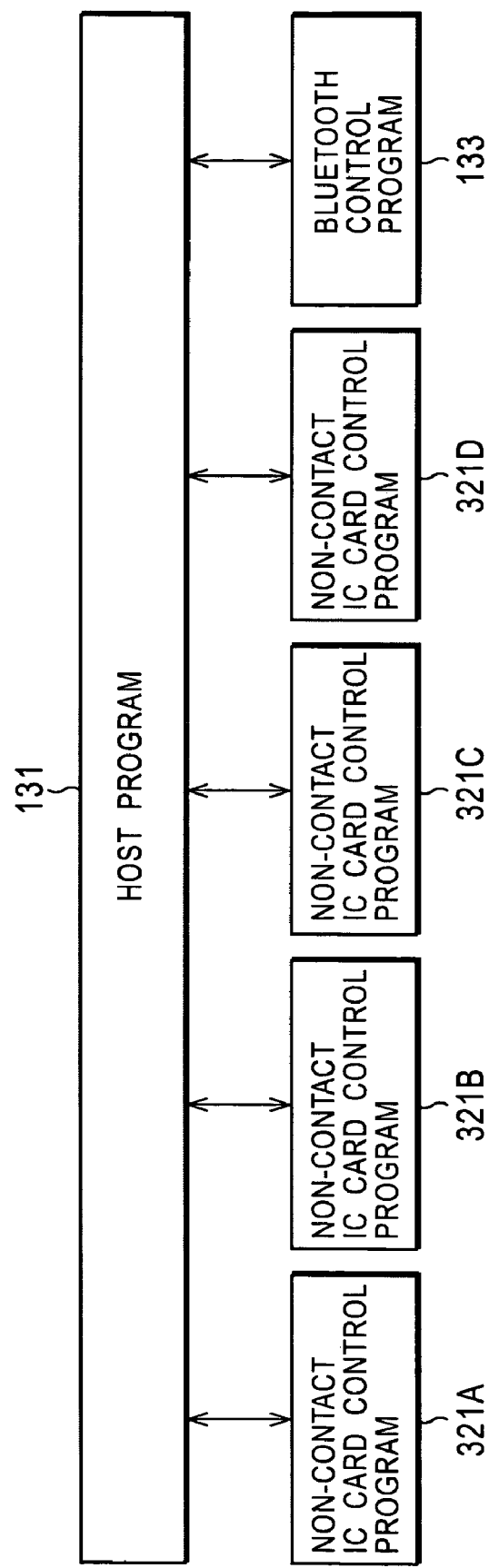
FIG. 22 is a block diagram showing another example of a functional construction of the information board shown in FIG. 1.

FIG. 22 is a block diagram showing an example of a construction of the information board 1 in which a non-contact IC card is disposed in each of the information requesting units 3A to 3D. This functional construction is basically similar to that shown in FIG. 8.

A host program 131, as with the host program 131 shown in FIG. 8, controls the operation of the entire information board 1. More specifically, if identification information of a content (identification information of a non-contact IC card disposed in one of the information requesting units 3A to 3D) is received from a PDA 11, the host program 131 acquires the specified content. The host program 131 then controls a Bluetooth control program 133 so as to transmit the acquired content to the PDA 11.

Non-contact IC card control programs 321A to 321D control the operations of non-contact IC cards disposed in the respective information requesting units 3A to 3D. When a reader/writer is brought close, a corresponding one of the non-contact IC card control programs 321A to 321D supplies the Bluetooth address of the information board 1 and the identification information of a content to the reader/writer.

Figure 23:
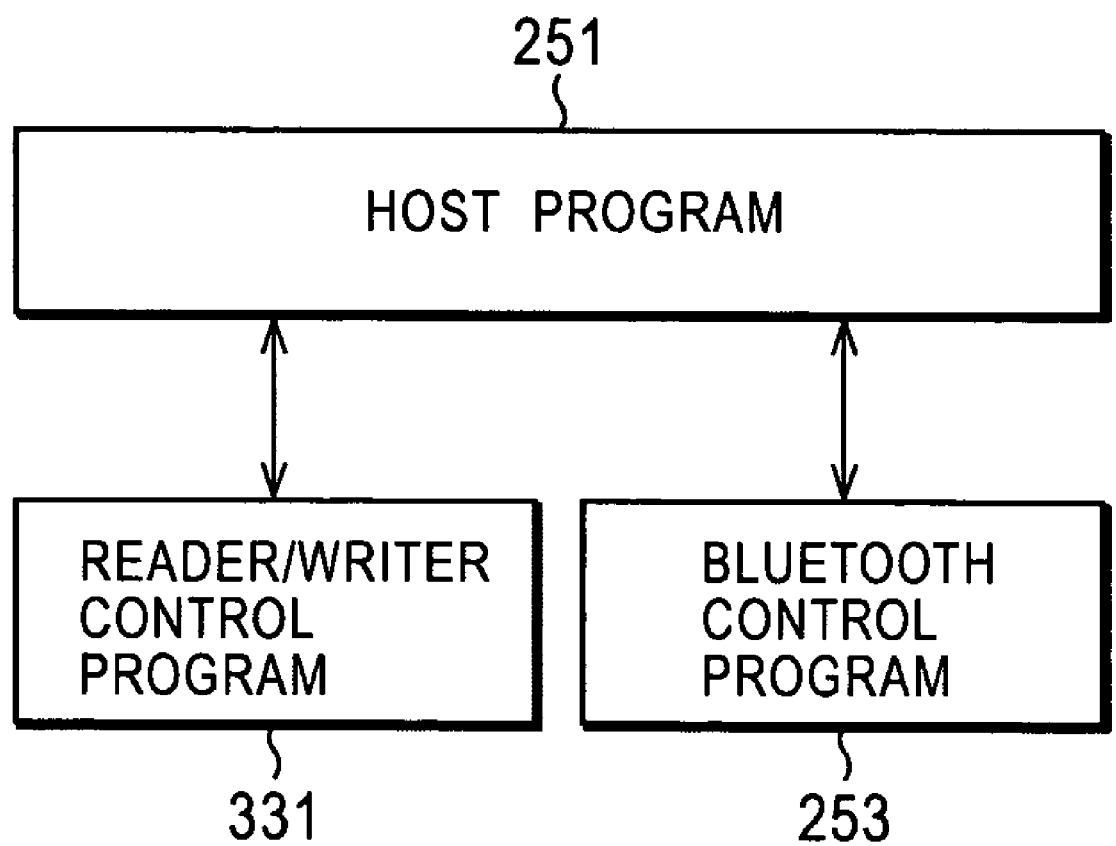
FIG. 23 is a block diagram showing another example of a functional construction of the PDA shown in FIG. 1.

FIG. 23 is a block diagram showing an example of a functional construction of the PDA 11 having a reader/writer disposed therein. This functional construction is basically similar to that shown in FIG. 14.

A reader/writer control program 331 controls the reader/writer disposed in the PDA 11 so as to supply the information read from a non-contact IC card disposed on the information board 1 to a host program 251.

Referring to flow charts shown in FIGS. 24 and 25, a processing sequence performed in the information providing system, shown in FIG. 1, including the information board 1 on which plural non-contact IC cards are disposed and the PDA 11 having the reader/writer disposed therein is described below.

In this example, the Bluetooth module 181 (the Bluetooth control program 253) of the PDA 11 serves as a master device, and the Bluetooth module 45 (the Bluetooth control program 133) of the information board 1 serves a slave device.

In step S321, in response to being activated, the reader/writer control program 331 of the PDA 11 radiates an electromagnetic wave at predetermined intervals of time from the antenna of the reader/writer to detect a non-contact IC card.

If the PDA 11 is brought close to, for example, the information requesting unit 3B of the information board 1, the non-contact IC card control program 321B of the information board 1 receives, in step S331, an electromagnetic wave radiated from the PDA 11. In response, the process proceeds to step S332. In step S332, the non-contact IC card control program 321B transmits the assigned card ID and the identification information assigned to the non-contact IC card (content identification information) to the PDA 11.

As described earlier, the card ID includes information associated with the Bluetooth address of the information board 1. The card ID may include the Bluetooth device name of the information board 1.

If the reader/writer control program 331 of the PDA 11 receives the above information in step S322, the process proceeds to step S323. In step S323, the reader/writer control program 331 transfers the received card ID and the content identification information to the Bluetooth control program 253.

If the Bluetooth control program 253 receives, in step S301, the ID card and the content identification information from the reader/writer control program 331, then, in the following steps 302 to 304, the Bluetooth control program 253 performs "inquiry".

In a case in which another terminal other than the information board 1 is present in the vicinity of the PDA 11, the Bluetooth device of that terminal is also detected via the "inquiry". In step S305, in accordance with the Bluetooth address received from the non-contact IC card and information described in FHS packets received from the information board 1 and the "another terminal", the Bluetooth control program 253 determines that the information board 1 is a device with which to communicate.

In steps S306 to S309 performed by the Bluetooth control program 253 of the PDA 11 and in steps S343 to S347 performed by the Bluetooth control program 133 of the information board 1, "page" is executed thereby achieving synchronization in Bluetooth communication.

In step S310, the Bluetooth control program 253 of the PDA 11 transmits the content identification information to the information board 1 and requests the information board 1 to transmit the content corresponding to the content identification information.

If the Bluetooth control program 133 of the information board 1 receives the request in step S348, the process proceeds to step S349. In step S349, the Bluetooth control program 133 transfers the received content identification information to the host program 131.

If the host program 131 receives the content identification information in step S361, the process proceeds to step S362. In step S362, the host program 131 searches the content storage unit 44 on the basis of the received content identification information to acquire the content to be provided to the PDA 11. In step S363, the host program 131 command the Bluetooth control program 133 to transmit the acquired content.

In step S351, the Bluetooth control program 133 controls various parts of the Bluetooth module 45 so as to transmit the content from the antenna 4.

In step S311, the transmitted content is received by the Bluetooth control program 253 of the PDA 11. Thereafter, the host program 251 outputs the content received from the information board 1.

As described above, also in the case in which the reader/writer is disposed in the PDA 11 and the non-contact IC card is disposed on the information board 1, a user can easily vie a desired content simply by bringing the PDA 11 close to a corresponding information requesting unit. As a matter of course, in the case in which a non-contact IC card is disposed in each information requesting unit of an information board 1 such as that shown in FIG. 20 or 21, a content can be provided to a user via a process similar to that described above with reference to FIGS. 24 and 25.

As described above, in the case in which the PDA 11 has the reader/writer disposed therein, it is possible to realize an information providing system in various ways by combining an apparatus for transmitting a content and a non-contact IC card in which a Bluetooth address and content identification information are stored.

For example, in a record shop, a non-contact IC card may be disposed on a jacket of each CD for sale, and a music content server for the purpose of pre-listening may be installed at a proper location in the record shop so that a user can pre-listen a desired CD simply by putting its jacket into his/her hand and bring the PDA 11 close to the non-contact IC card.

More specifically, if the PDA 11 is brought close to a non-contact IC card, the Bluetooth address stored in that non-contact IC card (the Bluetooth address of the server) and also the content identification information stored therein are read. After Bluetooth synchronization is achieved, the content identification information is supplied to the server. In response, the server acquires music data for test-listening corresponding to the content identification information and transmits acquired music data to the PDA 11.

In this case, the non-contact IC card and the server for providing contents can be separately installed at different locations, and thus it becomes unnecessary to provide a pre-listening sport or an information board such as that described earlier.

In a rental video shop or the like, if a non-contact IC card, in which the Bluetooth address of a server for transmitting promotion contents and video identification information are stored, is disposed on each rental video package, a user can view the promotion video on the PDA 11 by performing a similar operation.

The present invention may also be applied to advertisements in a train. If a non-contact IC card or a reader/writer is disposed on each advertisement, a user can view a moving picture or listen to a voice/sound presented as an advertisement on the PDA 11 simply by bringing the PDA 11 close to the non-contact IC card or the reader/writer.

In the embodiments described above, a card ID and a Bluetooth device name are stored separately in different memories. Alternatively, the card ID and the Bluetooth device name may be stored in a physically single piece of memory shared by the non-contact IC card 21 and the Bluetooth module 181. The shared memory may be installed in the memory stick 151 or in the PDA 11.

An information providing system in which Bluetooth addresses or Bluetooth device names are acquired by means of communication between non-contact IC cards and readers/writers and synchronization in a piconet is established on the basis of the acquired Bluetooth addresses or Bluetooth device names may be applied not only to the above-described system including the information board 1 and the PDA 11 but also to systems including various types of devices.

For example, an information providing system may be formed by combining a portable terminal such as a PDA 11 or a portable telephone and another apparatus such as a television set, a car navigation device, a vending machine, or an ATM (Automatic Teller machine).

Furthermore, the present invention is not limited to device-to-device communication. Communication units each including a reader/writer, a non-contact IC card, a Bluetooth module, or the like may be installed not only in devices but also in vehicles such as cars, trains, ships, or airplanes, and/or such communication units may also be installed at various locations in buildings or in towns so as to achieve communication among them via networks such as a LAN (Local Area Network), WAN (Wide Area Network), the Internet thereby achieving a ubiquitous network environment.

Although in the above-described embodiments according to the present invention, contents are transmitted by means of wireless communication based on the Bluetooth technique, wireless communication based on another technique such as a wireless LAN (IEEE (Institute of Electrical and Electronics Engineers) 802.11b) may also be employed.

In a case in which communication between devices is performed by means of a wireless LAN, information indicating, for example, an MAC (Media Access Control) address, the number of channels, and/or an ESS ID (Extended Service Set Identification) is transmitted from a non-contact IC card provided on a device to a terminal such as a PDA 11 brought by a user into a range close to the device.

Further examples of communication based on techniques other than Bluetooth include IEEE802.11a, IEE802.11g, IrDA, HomeRF (SWAP), and Wireless1394, which may also be employed in the present invention.

Instead of the above-described communication technique using a non-contact IC card 21, in which electric power and data are transmitted using a loop antenna, any communication technique may be employed as long as the output power is limited so that communication is allowed only in a short range as with the Bluetooth technique.

In the embodiments described above, the information board 1 or the PDA 11 identifies a device, with which to communicate, on the basis of a card ID indicating a Bluetooth address or a Bluetooth device name. Alternatively, another kind of information which can be used as unique identification information may also be employed.

For example, in a case in which 128-bit IPv6 (Internet Protocol version 6) is assigned to each device, the information board 1 serving as the master device may identify a device, with which to communicate, on the basis of identification information received from the non-contact IC card 21.

In the embodiments descried above, a terminal with which to communicate is identified on the basis of a card ID received from a non-contact IC card. Alternatively, an ID may be issued from a reader/writer to a terminal brought close to the reader/writer. In this case, when the terminal brought close to the reader/writer receives the ID from the reader/writer, the terminal rewrites the Bluetooth device name of the terminal on the basis of the received ID. On the other hand, the master device having the reader/writer disposed therein identifies the terminal, with which to communicate, by checking the issued ID and the Bluetooth device name received from the terminal after synchronization within a piconet has been achieved. This makes it possible to distinguish Bluetooth devices having their own non-contact IC card from those having no non-contact IC card. As described above, it is possible to identify a device, with which to communicate, in various ways.

Furthermore, instead of the memory stick 151, any other type of memory may be used, as long as it is formed such that it can be inserted into a slot. For example, an SD card (registered trademark) or a CF card (registered trademark) may be used instead of the memory stick 151.

In the embodiments described above, the reader/writer 31 and the non-contact IC card 21 are formed separately. Alternatively, a device functioning as both a reader/writer and a non-contact IC may be installed in the information board 1 and also in the PDA 11. Such a device having both functions may be installed in the memory stick 151 or the like so that the functions of the information board 1 and the PDA 11 can be extended by the memory stick 151.

In the case in which the non-contact IC card 21 is installed in a terminal such as the PDA 11, wireless communication based on the Bluetooth technique or the like may be started when an electromagnetic wave radiated from the reader/writer is received.

The processing sequence described above may be executed by hardware or software.

When the processing sequence is executed by software, a program forming the software may be installed from a storage medium or via a network onto a computer which is provided as dedicated hardware or may be installed onto a general-purpose computer capable of performing various processes in accordance with various programs installed thereon.

Specific examples of storage media usable for the above purpose include, as shown in FIG. 11, a magnetic disk 202 (such as a floppy disk), an optical disk 203 (such as a CD-ROM (Compact Disk-Read Only Memory) and a DVD (Digital Versatile Disk)), a magnetooptical disk 204 (such as an MD (Mini-Disc) (registered trademark), and a semiconductor memory 205, in the form of a package medium including a program stored thereon which is supplied to a user separately from a computer. A program may also be supplied to an user together with a computer including a built-in ROM 118 or the like, in which the program has been preinstalled.

In the present description, the steps described in the program stored in the storage medium may be performed either in time sequence in accordance with the order described in the program or in a parallel or separate fashion.

In the present description, the term "system" is used to represent an entire set of apparatuses.

INDUSTRIAL APPLICABILITY

As described above, the present invention makes it possible to easily acquire desired information.

The invention claimed is:

1. An information providing system including an information processing apparatus and a communication terminal, the information processing apparatus comprising:
   a plurality of display units for displaying guides about information to be provided; and
   first wireless communication units located close to the respective display units, for communicating with a communication terminal brought close to one of the first wireless communication units,
   the information processing apparatus further comprising:
   first acquisition means for acquiring identification information of the communication terminal brought close to one of the first wireless communication units, by means of first communication performed by the one of the first wireless communication units;
   first synchronization achieving means for, on the basis of the identification information acquired by the first acquisition means, achieving synchronization for second communication, using a second wireless communication unit different from the first wireless communication units, with the communication terminal;
   identification means for identifying the one of the first wireless communication units, close to which the communication terminal has been brought;
   information acquisition means for, depending on the first wireless communication unit identified by the identification means, acquiring information to be provided to the communication terminal; and
   first providing means for providing, by means of the second communication, the information acquired by the information acquisition means to the communication terminal with which synchronization has been achieved by the first synchronization achieving means,
   the communication terminal comprising:
   second providing means for, in response to a request issued by the information processing apparatus, providing the identification information of the communication terminal by means of the first communication performed by a third wireless communication unit operating using electric power generated by means of induction associated with reception of an electromagnetic wave;
   second synchronization achieving means for achieving synchronization for the second communication, using a fourth wireless communication unit different from the third wireless communication unit, with the information processing apparatus;
   receiving means for receiving the information transmitted from the information processing apparatus, by means of the second communication the synchronization of which has been achieved by the second synchronization achieving means; and
   outputting means for outputting the information received by the receiving means.

2. An information providing method for an information providing system including an information processing apparatus and a communication terminal, the information providing method comprising a method for the information processing apparatus including a plurality of display units for displaying guides about information to be provided; and first wireless communication units located close to the respective display units, for communicating with a communication terminal brought close to one of the first wireless communication units, the method for the information processing apparatus comprising:
   a first acquisition step, of acquiring identification information of a communication terminal brought close to one of first wireless communication units, by means of first communication performed by the one of first wireless communication units;
   a first synchronization achieving step of, on the basis of the identification information acquired in the first acquisition step, achieving synchronization for second communication, using a second wireless communication unit different from the first wireless communication units, with the communication terminal;
   an identification step of identifying the one of the first wireless communication units, close to which the communication terminal has been brought;
   an information acquisition step of, depending on the first wireless communication unit identified in the identification step, acquiring information to be provided to the communication terminal; and
   a first providing step of providing, by means of the second communication, the information acquired in the information acquisition step to the communication terminal with which synchronization has been achieved in the first synchronization achieving step,
   the information providing method also comprising a method for the communication terminal, comprising:
   a second providing step of, in response to a request issued by the information processing apparatus, providing the identification information of the communication terminal by means of the first communication performed by a third wireless communication unit operating using electric power generated by means of induction associated with reception of an electromagnetic wave;
   a second synchronization achieving step of achieving synchronization for the second communication, using a fourth wireless communication unit different from the third wireless communication unit, with the information processing apparatus;

a receiving step of receiving the information transmitted from the information processing apparatus, by means of the second communication the synchronization of which has been achieved in the second synchronization achieving step; and an outputting step of outputting the information received in the receiving step.

3. An information processing apparatus comprising a plurality of display units for displaying guides about information to be provided; and first wireless communication units located close to the respective display units, for communicating with a communication terminal brought close to one of the first wireless communication units, the information processing apparatus further comprising:

first acquisition means for acquiring identification information of the communication terminal brought close to one of the first wireless communication units, by means of first communication performed by the one of the first wireless communication units;

synchronization achieving means for, on the basis of the identification information acquired by the first acquisition means, achieving synchronization for second communication, using a second wireless communication unit different from the first wireless communication units, with the communication terminal;

identification means for identifying the one of the first wireless communication units, close to which the communication terminal has been brought;

information acquisition means for, depending on the first wireless communication unit identified by the identification means, acquiring information to be provided to the communication terminal; and providing means for providing, by means of the second communication, the information acquired by the information acquisition means to the communication terminal with which synchronization has been achieved by the synchronization achieving means.

4. An information processing apparatus according to claim 3, wherein the synchronization achieving means achieves synchronization by acquiring attribute information of a plurality of terminals, including said communication terminal, present in the vicinity of the information processing apparatus, and achieving synchronization with the communication terminal detected, on the basis of the identification information, as a terminal which has transmitted attribute information corresponding to the identification information.

5. An information processing apparatus according to claim 3, wherein the providing means provides the information by a process including acquiring terminal name information from each of the plurality of terminals, including said communication terminal, present in the vicinity of the information processing apparatus the synchronization of which has been achieved by the synchronization achieving means; on the basis of the identification information, identifying the communication terminal which has transmitted terminal name information corresponding to the identification information; and providing the information to said communication terminal.

6. An information processing apparatus according to claim 3, wherein the information acquisition means acquires the information to be provided to the communication terminal from a storage unit disposed in the information processing apparatus or from a storage unit disposed close to the information processing apparatus.

7. An information processing apparatus according to claim 3, wherein the information acquisition means acquires the information to be provided to the communication terminal from a particular server via a network.

8. An information processing apparatus according to claim 3, further comprising changing means for changing a guide displayed on the display unit to another guide, wherein the information acquisition means acquires the information to be provided to the communication terminal, depending on the guide changed by the changing means.

9. An information processing method for an information processing apparatus including a plurality of display units for displaying guides about information to be provided; and first wireless communication units located close to the respective display units, for communicating with a communication terminal brought close to one of the first wireless communication units, the information processing method comprising:

a first acquisition step, of acquiring identification information of a communication terminal brought close to one of first wireless communication units, by means of first communication performed by the one of first wireless communication units;

a synchronization achieving step of, on the basis of the identification information acquired in the first acquisition step, achieving synchronization for second communication, using a second wireless communication unit different from the first wireless communication units, with the communication terminal;

an identification step of identifying the one of the first wireless communication units, close to which the communication terminal has been brought;

an information acquisition step of, depending on the first wireless communication unit identified in the identification step, acquiring information to be provided to the communication terminal; and a providing step of providing, by means of the second communication, the information acquired in the information acquisition step to the communication terminal with which synchronization has been achieved in the synchronization achieving step.

10. A program for a computer to execute a process associated with an information processing apparatus including a plurality of display units for displaying guides about information to be provided; and first wireless communication units located close to the respective display units, for communicating with a communication terminal brought close to one of the first wireless communication units, the process comprising:

a first acquisition step, of acquiring identification information of a communication terminal brought close to one of first wireless communication units, by means of first communication performed by the one of first wireless communication units;

a synchronization achieving step of, on the basis of the identification information acquired in the first acquisition step, achieving synchronization for second communication, using a second wireless communication unit different from the first wireless communication units, with the communication terminal;

an identification step of identifying the one of the first wireless communication units, close to which the communication terminal has been brought;

an information acquisition step of, depending on the first wireless communication unit identified in the identification step, acquiring information to be provided to the communication terminal; and a providing step of providing, by means of the second communication, the information acquired in the information acquisition step to the communication terminal with which synchronization has been achieved in the synchronization achieving step.

11. An information providing system including an information processing apparatus and a communication terminal, the information processing apparatus comprising:

a plurality of display units for displaying guides about information to be provided; and first wireless communication units which are disposed on the respective display units and which operate using electric power generated by means of induction associated with reception of an electromagnetic wave transmitted from the communication terminal brought close, the information processing apparatus further comprising:

first providing means for providing first identification information assigned to a first wireless communication unit, which is one of the plurality of first wireless communication units and close to which the communication terminal has been brought, and also providing second identification information identifying information to be provided, by means of first communication performed by the first wireless communication unit close to which the communication terminal has been brought;

first synchronization achieving means for achieving synchronization for second communication, using a second wireless communication unit different from the first wireless communication units, with the communication terminal;

information acquisition means for acquiring information corresponding to the second identification information, in response to receiving the first identification information transmitted from the communication terminal by means of the second communication the synchronization of which has been achieved by the first synchronization achieving means; and second providing means for providing the information acquired by the information acquisition means to the communication terminal by using the second communication, the communication terminal comprising:

a third wireless communication unit for communicating, via an electromagnetic wave, with a first wireless communication unit, which is one of the plurality of first wireless communication units disposed in the information processing apparatus and close to which the communication terminal has been brought, acquisition means for acquiring, by means of the first communication performed by the third wireless communication unit, the first identification information assigned to the first wireless communication unit, close to which the communication terminal has been brought, and also acquiring the second identification information identifying the information to be provided by the information processing apparatus;

second synchronization achieving means for, on the basis of the first identification information acquired by the acquisition means, achieving synchronization for the second communication, using a fourth wireless communication unit different from the third wireless communication unit, with the information processing apparatus;

requesting means for requesting the information processing apparatus to provide information corresponding to the second identification information, by transmitting the second identification information acquired by the acquisition means to the information processing apparatus by means of the second communication the synchronization of which has been achieved by the second synchronization means; and receiving means for receiving the information transmitted, in response to the request issued by the requesting means, from the information processing apparatus by means of the second communication.

12. An information providing method for an information providing system including an information processing apparatus and a communication terminal, the information providing method comprising a method for the information processing apparatus including a plurality of display units for displaying guides about information to be provided; first wireless communication units which are disposed close to the respective display units and which operate using electric power generated by means of induction associated with reception of an electromagnetic wave transmitted from the communication terminal brought close, the method for the information processing apparatus comprising:

a first providing step of providing first identification information assigned to a first wireless communication unit, which is one of the plurality of first wireless communication units and close to which the communication terminal has been brought, and also providing second identification information identifying information to be provided, by means of first communication performed by the first wireless communication unit close to which the communication terminal has been brought;

a first synchronization achieving step, of achieving synchronization for second communication, using a second wireless communication unit different from the first wireless communication units, with the communication terminal;

an information acquisition step of acquiring information corresponding to the second identification information, in response to receiving the second identification information transmitted, by means of the second communication the synchronization of which has been achieved in the first synchronization achieving step, from the communication terminal; and a second providing step of providing the information acquired in the information acquisition step to the communication terminal by using the second communication, the information providing method also comprising a method for the communication terminal including a third wireless communication unit for communicating, via an electromagnetic wave, with a first wireless communication unit, which is one of the plurality of first wireless communication units disposed in the information processing apparatus and close to which the communication terminal has been brought, the method for the communication terminal comprising:

an acquisition step of acquiring, by means of the first communication performed by the third wireless communication unit, the first identification information assigned to the first wireless communication unit, close to which the communication terminal has been brought, and also acquiring the second identification information identifying the information to be provided by the information processing apparatus;

a second synchronization achieving step of, on the basis of the first identification information acquired in the acquisition step, achieving synchronization for the second communication, using a fourth wireless communication unit different from the third wireless communication unit, with the information processing apparatus;

a request issuing step of requesting the information processing apparatus to provide information corresponding to the second identification information, by transmitting the second identification information acquired in the acquisition step to the information processing apparatus by means of the second communication the synchronization of which has been achieved in the second synchronization step; and a receiving step of receiving the information transmitted, in response to the request issued in the request issuing step, from the information processing apparatus, by means of the second communication.

13. An information processing apparatus comprising a plurality of display units for displaying guides about information to be provided; and first wireless communication units which are disposed on the respective display units and which operate using electric power generated by means of induction associated with reception of an electromagnetic wave transmitted from a communication terminal brought close, the information processing apparatus further comprising first providing means for providing first identification information assigned to a first wireless communication unit, which is one of the plurality of first wireless communication units and close to which the communication terminal has been brought, and also providing second identification information identifying information to be provided, by means of first communication performed by the first wireless communication unit close to which the communication terminal has been brought;

synchronization achieving means for achieving synchronization for second communication, using a second wireless communication unit different from the first wireless communication units, with the communication terminal;

information acquisition means for acquiring information corresponding to the second identification information, in response to receiving the second identification information transmitted from the communication terminal by means of the second communication the synchronization of which has been achieved by the synchronization achieving means; and second providing means for providing the information acquired by the information acquisition means to the communication terminal by using the second communication.

14. An information processing apparatus according to claim 13, wherein the information acquisition means acquires the information to be provided to the communication terminal from a storage unit disposed in the information processing apparatus.

15. An information processing apparatus according to claim 13, wherein the information acquisition means acquires the information to be provided to the communication terminal from a particular server via a network.

16. An information processing apparatus according to claim 13, further comprising changing means for changing a guide displayed on the display unit to another guide, wherein the information acquisition means acquires the information to be provided to the communication terminal, depending on the guide changed by the changing means.

17. An information processing method for an information processing apparatus including a plurality of display units for displaying guides about information to be provided; and first wireless communication units which are disposed close to the respective display units and which operate using electric power generated by means of induction associated with reception of an electromagnetic wave transmitted from a communication terminal brought close, the information processing method comprising:

a first providing step of providing first identification information assigned to a first wireless communication unit, which is one of the plurality of first wireless communication units and close to which the communication terminal has been brought, and also providing second identification information identifying information to be provided, by means of first communication performed by the first wireless communication unit close to which the communication terminal has been brought;

a synchronization achieving step of achieving synchronization for second communication, using a second wireless communication unit different from the first wireless communication units, with the communication terminal;

an information acquisition step of acquiring information corresponding to the second identification information, in response to receiving the second identification information transmitted, by means of the second communication the synchronization of which has been achieved in the synchronization achieving means, from the communication terminal; and a second providing step of providing the information acquired in the information acquisition step to the communication terminal by using the second communication.

18. A program for a computer to execute a process associated with an information processing apparatus including a plurality of display units for displaying guides about information to be provided; and first wireless communication units which are disposed close to the respective display units and which operate using electric power generated by means of induction associated with reception of an electromagnetic wave transmitted from a communication terminal brought close, the process comprising:

a first providing step of providing first identification information assigned to a first wireless communication unit, which is one of the plurality of first wireless communication units and close to which the communication terminal has been brought, and also providing second identification information identifying information to be provided, by means of first communication performed by the first wireless communication unit close to which the communication terminal has been brought;

a synchronization achieving step of achieving synchronization for second communication, using a second wireless communication unit different from the first wireless communication units, with the communication terminal;

an information acquisition step of acquiring information corresponding to the second identification information, in response to receiving the second identification information transmitted, by means of the second communication the synchronization of which has been achieved in the synchronization achieving means, from the communication terminal; and a second providing step of providing the information acquired in the information acquisition step to the communication terminal by using the second communication.

19. A communication terminal comprising a first wireless communication unit for communicating, via an electromagnetic wave, with a wireless communication unit, which is one of a plurality of wireless communication units disposed in an information processing apparatus and close to which the communication terminal has been brought, the communication terminal further comprising:

acquisition means for acquiring, by means of first communication performed by the first wireless communication unit, first identification information assigned to the wireless communication unit, close to which the communication terminal has been brought, and also acquiring second identification information identifying information to be provided by the information processing apparatus;

synchronization achieving means for, on the basis of the first identification information acquired by the acquisition means, achieving synchronization for second communication, using a second wireless communication unit different from the first wireless communication unit, with the information processing apparatus;

requesting means for requesting the information processing apparatus to provide information corresponding to the second identification information, by transmitting the second identification information acquired by the acquisition means to the information processing apparatus by means of the second communication the synchronization of which has been achieved by the synchronization means; and receiving means for receiving the information transmitted, in response to the request issued by the requesting means, from the information processing apparatus, by means of the second communication.

20. A communication terminal according to claim 19, wherein the synchronization achieving means achieves synchronization by acquiring attribute information of a plurality of terminals, including the information processing terminal, present in the vicinity of the communication terminal, and achieving synchronization with the information processing apparatus detected, on the basis of the first identification information, as a terminal which has transmitted attribute information corresponding to the first identification information.

21. A communication terminal according to claim 19, wherein the requesting means requests the information processing apparatus to provide the information by a process including acquiring terminal name information from each of the plurality of terminals, including the information processing apparatus, which are present in the vicinity of the communication terminal and the synchronization of which has been achieved by the synchronization achieving means; on the basis of the first identification information, identifying the information processing apparatus which has transmitted terminal name information corresponding to the first identification information; and requesting the information processing apparatus to provide said information.

22. A communication method for a communication terminal including a first wireless communication unit for communicating, via an electromagnetic wave, with a wireless communication unit, which is one of a plurality of wireless communication disposed in an information processing apparatus and close to which the communication terminal has been brought, the communication method for the communication terminal comprising:

an acquisition step of acquiring, by means of first communication performed by the first wireless communication unit, first identification information assigned to the wireless communication unit, close to which the communication terminal has been brought, and also acquiring second identification information identifying information to be provided by the information processing apparatus;

a synchronization achieving step of, on the basis of the first identification information acquired in the acquisition step, achieving synchronization for second communication, using a second wireless communication unit different from the first wireless communication unit, with the information processing apparatus;

a request issuing step of requesting the information processing apparatus to provide information corresponding to the second identification information, by transmitting the second identification information acquired in the acquisition step to the information processing apparatus by means of the second communication the synchronization of which has been achieved in the synchronization step; and a receiving step of receiving the information transmitted, in response to the request issued in the request issuing step, from the information processing apparatus, by means of the second communication.

23. A program for a computer to execute a process associated with a communication terminal including a first wireless communication unit for communicating, via an electromagnetic wave, with a wireless communication unit, which is one of a plurality of wireless communication disposed in an information processing apparatus and close to which the communication terminal has been brought, the process comprising:

an acquisition step of acquiring, by means of first communication performed by the first wireless communication unit, first identification information assigned to the wireless communication unit, close to which the communication terminal has been brought, and also acquiring second identification information identifying information to be provided by the information processing apparatus;

a synchronization achieving step of, on the basis of the second identification information acquired in the acquisition step, achieving synchronization for second communication, using a second wireless communication unit different from the first wireless communication unit, with the information processing apparatus;

a request issuing step of requesting the information processing apparatus to provide information corresponding to the second identification information, by transmitting the second identification information acquired in the acquisition step to the information processing apparatus by means of the second communication the synchronization of which has been achieved in the synchronization step; and a receiving step of receiving the information transmitted, in response to the request issued in the request issuing step, from the information processing apparatus, by means of the second communication.

24. An information processing apparatus comprising at least one or more display units for displaying guides about information to be provided; and a plurality of first wireless communication units disposed on the one or more display units, for communicating with a communication terminal brought close to one of the first wireless communication units, the information processing apparatus further comprising:
- an information storage unit for storing a plural pieces of information to be provided, said plural pieces of information corresponding to the respective first wireless communication units;
- identification means for identifying the one of the first wireless communication units, close to which the communication terminal has been brought;
- information acquisition means for, depending on the first wireless communication unit identified by the identification means, acquiring information to be provided to the communication terminal from the information storage unit; and
- providing means for providing, by means of the second communication using a second wireless communication unit different from the first wireless communication unit, the information acquired by the information acquisition means to the communication terminal.

* * * * *